(12) United States Patent
Alderson et al.

(10) Patent No.: US 8,592,681 B2
(45) Date of Patent: Nov. 26, 2013

(54) ELECTRICAL DEVICE WITH REMOVABLE COVER

(75) Inventors: R. David Alderson, Morganton, NC (US); Jerry R. Hoffman, Hickory, NC (US); Michael D. Williams, Morganton, NC (US); Ronald H. Jansen, Queens, NY (US); Adam Kevelos, Coram, NY (US); Nehal P. Shah, Westbury, NY (US); Kang Pin Tee, Brooklyn, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 194 days.

(21) Appl. No.: 12/768,627

(22) Filed: Apr. 27, 2010

(65) Prior Publication Data

US 2011/0261511 A1 Oct. 27, 2011

(51) Int. Cl.
*H05K 5/03* (2006.01)

(52) U.S. Cl.
USPC .............................. 174/66; 174/67; 220/241

(58) Field of Classification Search
USPC ............................ 174/66, 67; 220/241, 242
See application file for complete search history.

(56) References Cited

U.S. PATENT DOCUMENTS

| | | | |
|---|---|---|---|
| 2,439,708 A * | 4/1948 | Abraham | 200/50.1 |
| 4,500,746 A | 2/1985 | Meehan | |
| 5,213,204 A | 5/1993 | Sommer | |
| 5,317,108 A * | 5/1994 | Prairie, Jr. | 174/67 |
| 5,484,309 A | 1/1996 | Howard et al. | |
| 5,744,750 A | 4/1998 | Almond | |
| 5,783,787 A | 7/1998 | Data | |
| 5,863,016 A | 1/1999 | Makwinski et al. | |
| 5,961,345 A | 10/1999 | Finn et al. | |
| 6,005,308 A | 12/1999 | Bryde et al. | |
| 6,160,219 A * | 12/2000 | Maltby et al. | 174/66 |
| 6,410,850 B1 | 6/2002 | Abel et al. | |
| 6,441,304 B1 | 8/2002 | Currier et al. | |
| 6,891,117 B1 | 5/2005 | Gouhl et al. | |
| 7,049,537 B1 | 5/2006 | Shotey et al. | |
| 7,273,983 B1 | 9/2007 | Rintz | |
| 7,396,997 B2 * | 7/2008 | Dinh | 174/67 |
| 7,425,681 B2 * | 9/2008 | Xu et al. | 174/66 |
| 7,431,594 B2 * | 10/2008 | Castaldo et al. | 439/135 |

(Continued)

FOREIGN PATENT DOCUMENTS

| KR | 20-1992-0003364 Y1 | 5/1992 |
|---|---|---|
| KR | 10-2003-0039979 A | 5/2003 |

(Continued)

OTHER PUBLICATIONS

International Search Report and Written Opinion for PCT/US2011/033666, dated Feb. 8, 2012, 14 pages.

*Primary Examiner* — Dhirubhai R Patel
(74) *Attorney, Agent, or Firm* — Marger Johnson & McCollom PC

(57) ABSTRACT

In one embodiment, a system includes an electrical device and a removable cover, where the electrical device and the removable cover are adapted to enable the removable cover to pivot into an installed position on the electrical device. In another embodiment, a system includes an electrical device having a pushbutton, and a cover adapted to be removably attached to the electrical device, where the cover includes an opening for accessing the pushbutton, and where the pushbutton includes a sub button and a cosmetic cap adapted to be removably attached to the sub button.

58 Claims, 23 Drawing Sheets

(56) References Cited

U.S. PATENT DOCUMENTS

| | | |
|---|---|---|
| 7,476,121 B2 | 1/2009 | Tsuji |
| 7,538,285 B2 | 5/2009 | Patel et al. |
| 7,579,566 B2 * | 8/2009 | Sloan et al. ............ 200/331 |
| 7,667,616 B2 | 2/2010 | Fair et al. |
| 7,756,556 B2 | 7/2010 | Patel et al. |
| 7,915,528 B2 * | 3/2011 | Ni ............................ 174/53 |
| 7,968,794 B1 * | 6/2011 | Baldwin ...................... 174/67 |
| 8,138,435 B2 | 3/2012 | Patel et al. |
| 2007/0193863 A1 | 8/2007 | Wu |

FOREIGN PATENT DOCUMENTS

| | | |
|---|---|---|
| KR | 20-0405520 Y1 | 1/2006 |
| KR | 10-0632451 B1 | 10/2006 |
| KR | 20-2009-006210 U | 12/2007 |
| MX | 28466 | 12/2008 |
| MX | 29052 | 12/2008 |
| WO | 2010/070376 A1 | 6/2010 |

* cited by examiner

ELECTRICAL DEVICE WITH REMOVABLE COVER

BACKGROUND

Color change kits are used to replace the visible parts of wiring devices such as wall switches, dimmers, lighting scene controls, etc. By removing the existing visible parts and replacing them with parts of a different color, the appearance of wiring devices can be changed to coordinate with changes to interior decorating, to accommodate changes in contemporary styling, to replace damaged components, or simply to provide variety to building occupants.

FIG. 1 illustrates a prior art color change kit. The system of FIG. 1 includes a wiring device 10 having a mounting plate 12 that positions the device against a wall surface when the device is attached to an electrical box. The color change kit includes a frame 14 having five actuators 16 for implementing the functions of the wiring device. The mounting plate 12 includes four slots 18 that receive resilient snaps 22 on the frame of the color change kit. In the view of FIG. 1, only two of the snaps are visible. The color change kit is installed by aligning the snaps with the slots and pushing the frame against the plate until all four snaps latch into the corresponding slots on the plate.

To change the kit, the snaps are pushed in at the sides of the frame to release the snaps from the slots. The frame is then pulled away from the plate, and a new color kit is installed as described above.

DETAILED DESCRIPTION

Figure 1:
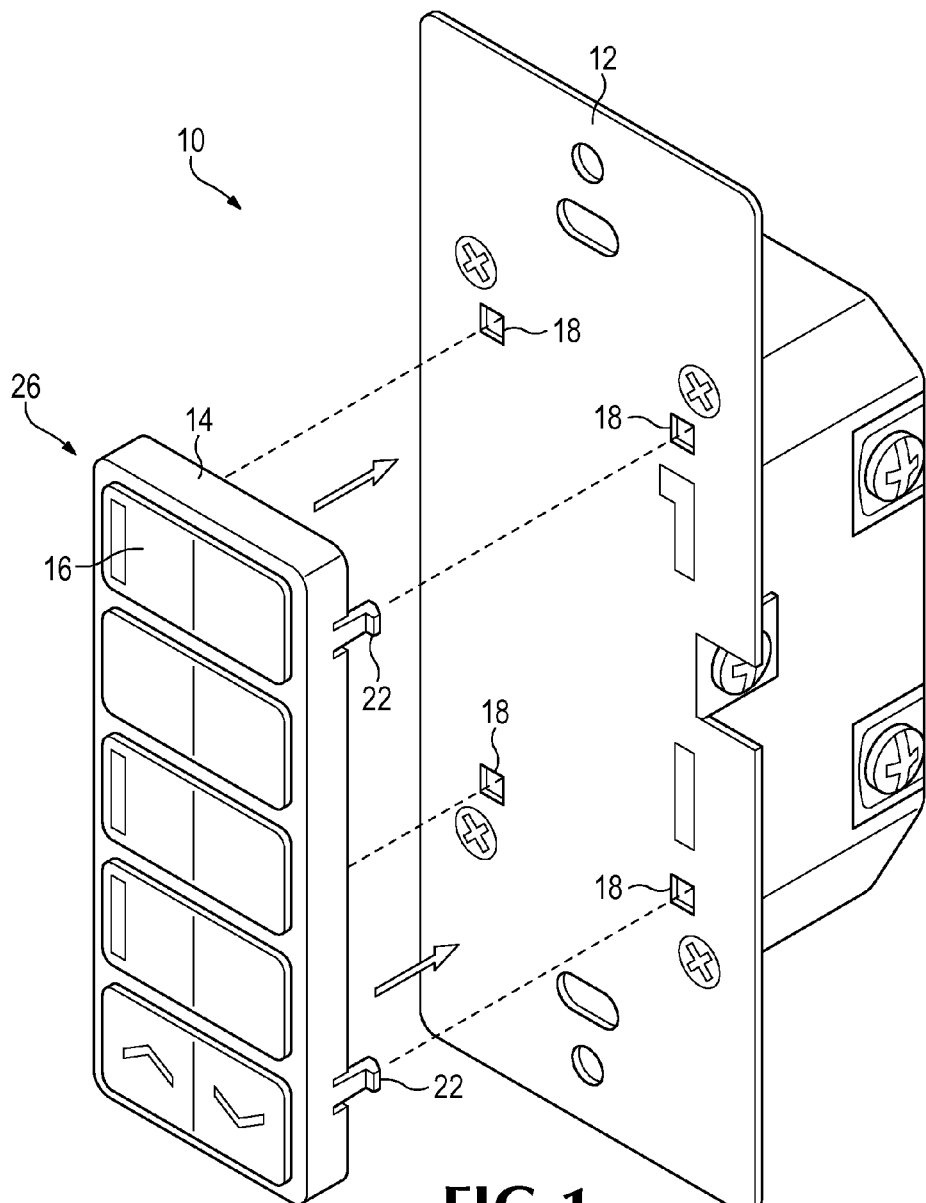
FIG. 1 illustrates a prior art color change kit.
Figure 2:
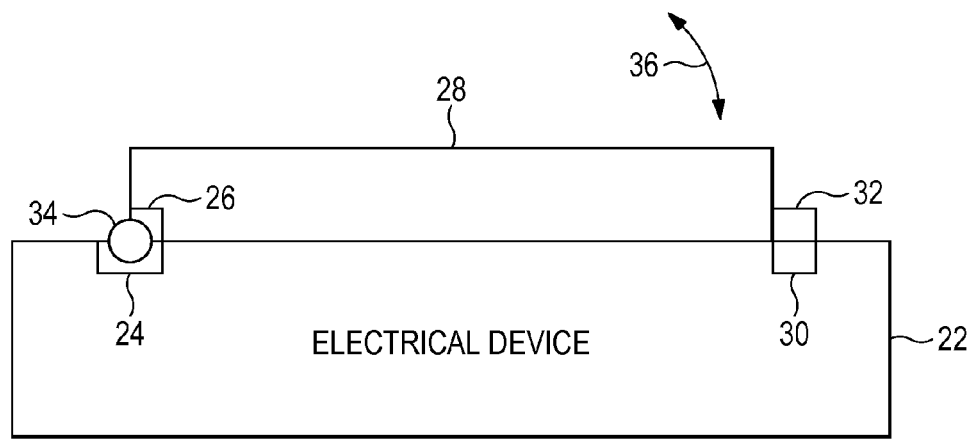
FIG. 2 illustrates an embodiment of a system for changing the color of an electrical device according to some inventive principles of this patent disclosure.

FIG. 2 illustrates an embodiment of an interchangeable cover system for an electrical device according to some inventive principles of this patent disclosure. The embodiment of FIG. 2 includes an electrical device 22 and a removable cover 28 that is pivotally attached to the electrical device 22 at a pivot point 34 to enable the cover to pivot towards or away from the electrical device as shown by arrow 36. The electrical device 22 includes one or more retention features 24 adapted to pivotally engage one or more corresponding retention features 26 on the removable cover 28. The electrical device also includes one or more fastening features 30 adapted to engage one or more corresponding fastening features 32 on the removable cover to maintain the cover in the installed position as shown in FIG. 2.

The pivot point 34 may be positioned at any suitable location which, depending on the implementation details, may typically be at or near an end of the cover 28. The fastening features 30 and 32 may also be positioned at any suitable location anywhere along the cover, and depending on the implementation, may typically be at the end opposite the hinge features. Opposite, as used herein, may refer to not only to an arrangement that is directly opposite, but also to an arrangement in which the features are located anywhere along the other periphery, i.e., side or end. The hinge features may be implemented with any suitable pivoting attachment technique such as hinge pins, hinge feet, rotating tabs, etc. The fastening features may be implemented with resilient fastening features such as snaps, as well as other fastening features such as screws, magnets, or any other removable fastening features. The electrical device 22 may be any suitable device such as a wall switch, dimmer, fan speed control, receptacle, etc.

Figure 3:
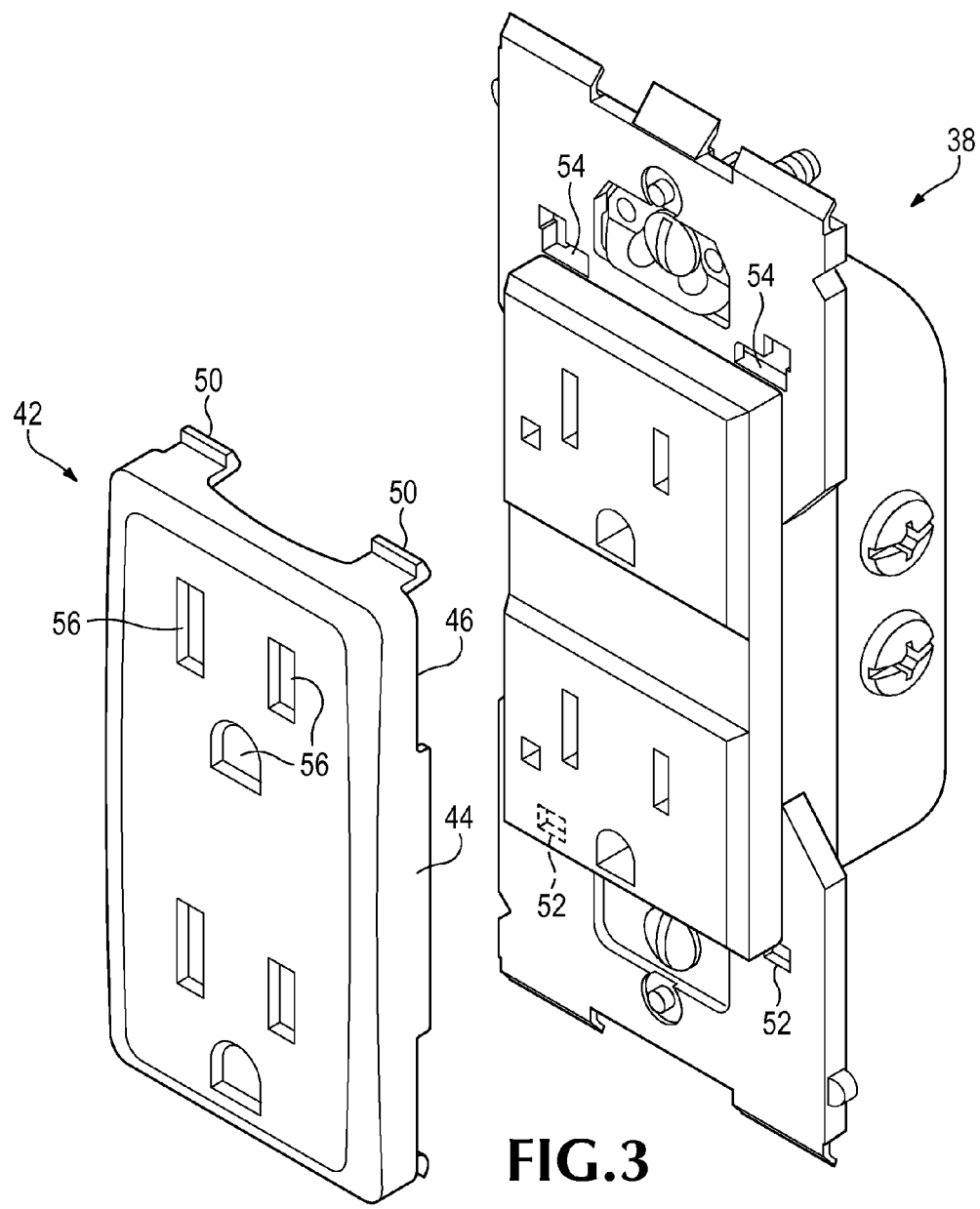
FIG. 3 illustrates an example embodiment of a system for changing the color of an electrical device according to some inventive principles of this patent disclosure.

FIG. 3 illustrates an example embodiment of an interchangeable cover system for an electrical device according to some inventive principles of this patent disclosure. The embodiment of FIG. 3 is described in the context of some specific device types and implementation details, but the inventive principles are not limited to these details. For example, in the embodiment of FIG. 3 the electrical device 38 is shown as a wiring device with duplex receptacles, and the interchangeable cover may be implemented as a color change kit, but the inventive principles may be applied to other types of devices and interchangeable covers.

A removable cover 42 includes two hinge features which in this example are implemented as hinge feet 48 at the bottom end of the cover, and two resilient fastening features which in this example are implemented as cantilevered snaps 50 at the top end of the cover. The hinge feet are adapted to engage two corresponding hinge features which in this example are implemented as openings 52 on the front surface of the wiring device. The snaps are adapted to flex and engage two corresponding snap openings 54 on the front of the wiring device.

The cover 42 includes openings 56 positioned to align with the receptacle openings of the wiring device when the cover is in the installed position. The receptacle includes a raised portion 40 which projects above the mounting plane of the device. The cover 42 includes a rim 44 that overlaps the raised portion of the electrical device when the cover is in the installed position. The rim 44 may include cutouts 46 for clearance around various features of the electrical device.

Figure 4:
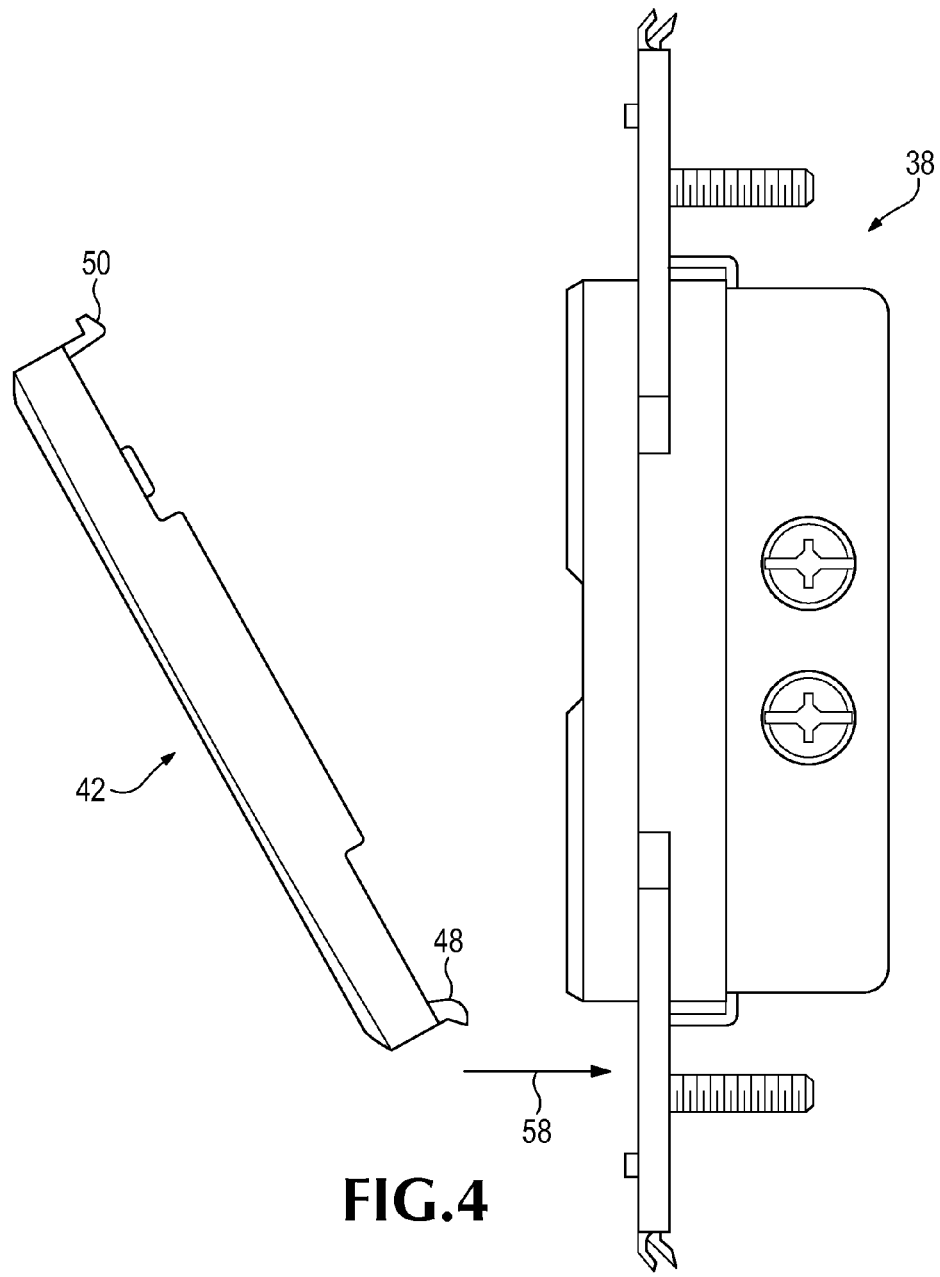
FIGS. 4-8 illustrate an embodiment of a method for installing a cover according to some inventive principles of this patent disclosure.
Figure 5:
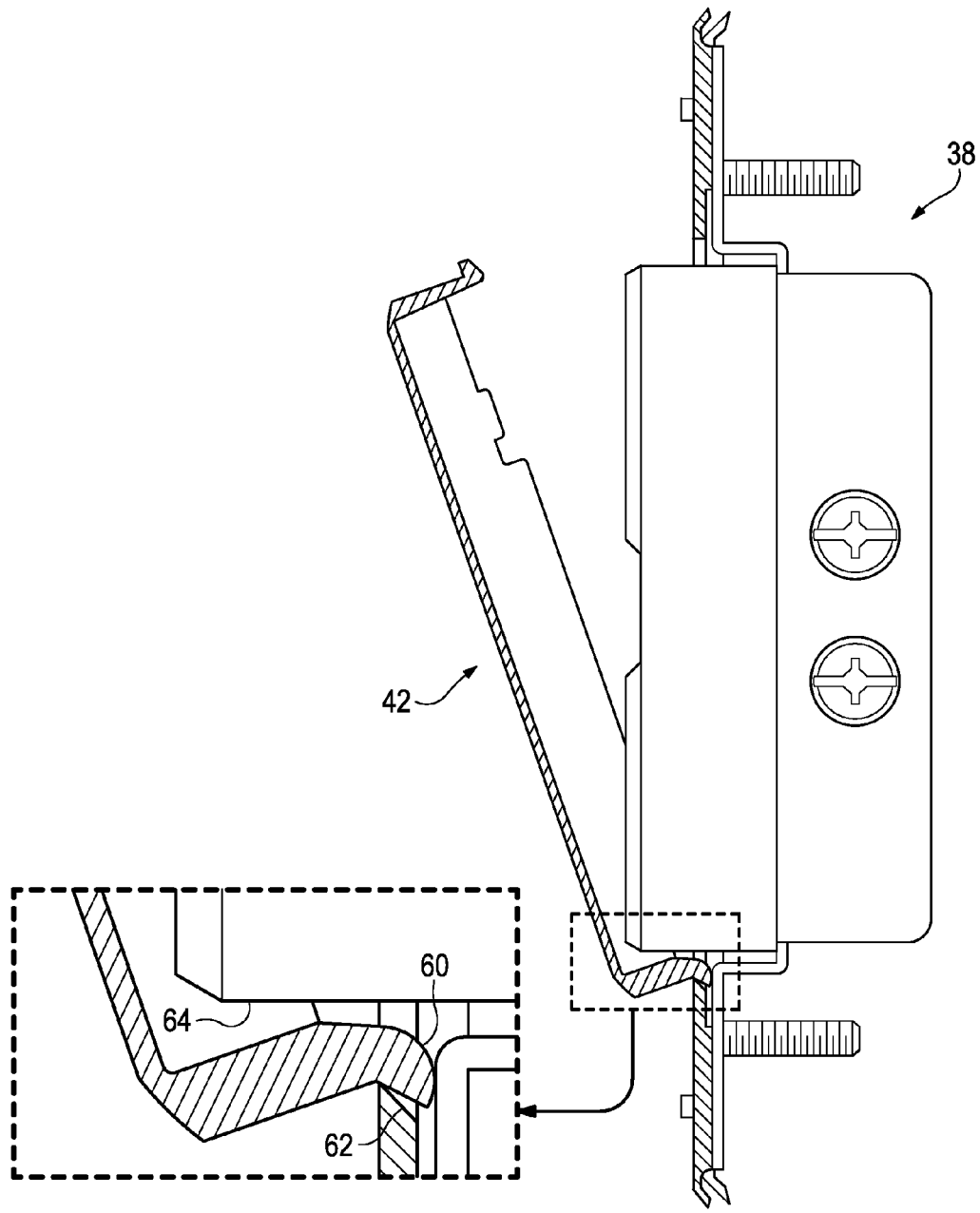

A method for installing the cover 42 is illustrated in FIGS. 4-8. Referring first to FIG. 4, the cover 42 is held at an angle that is essentially pivoted downward from the front of the wiring device 38 to enable the hinge feet 48 to be inserted into the hinge openings on the front of the wiring device in the direction of arrow 58. The engagement of the hinge feet is shown in more detail in the partial cutaway view of FIG. 5. As best seen in the enlarged inset of FIG. 5, the front cover must be tilted to enable the leading edge 60 of a hinge foot to enter the passageway between the edge 62 of the hinge opening and the bottom 64 of the raised portion of the receptacle. In this position, a flat surface of the hinge foot partially engages a beveled side of the hinge opening.

Figure 6:
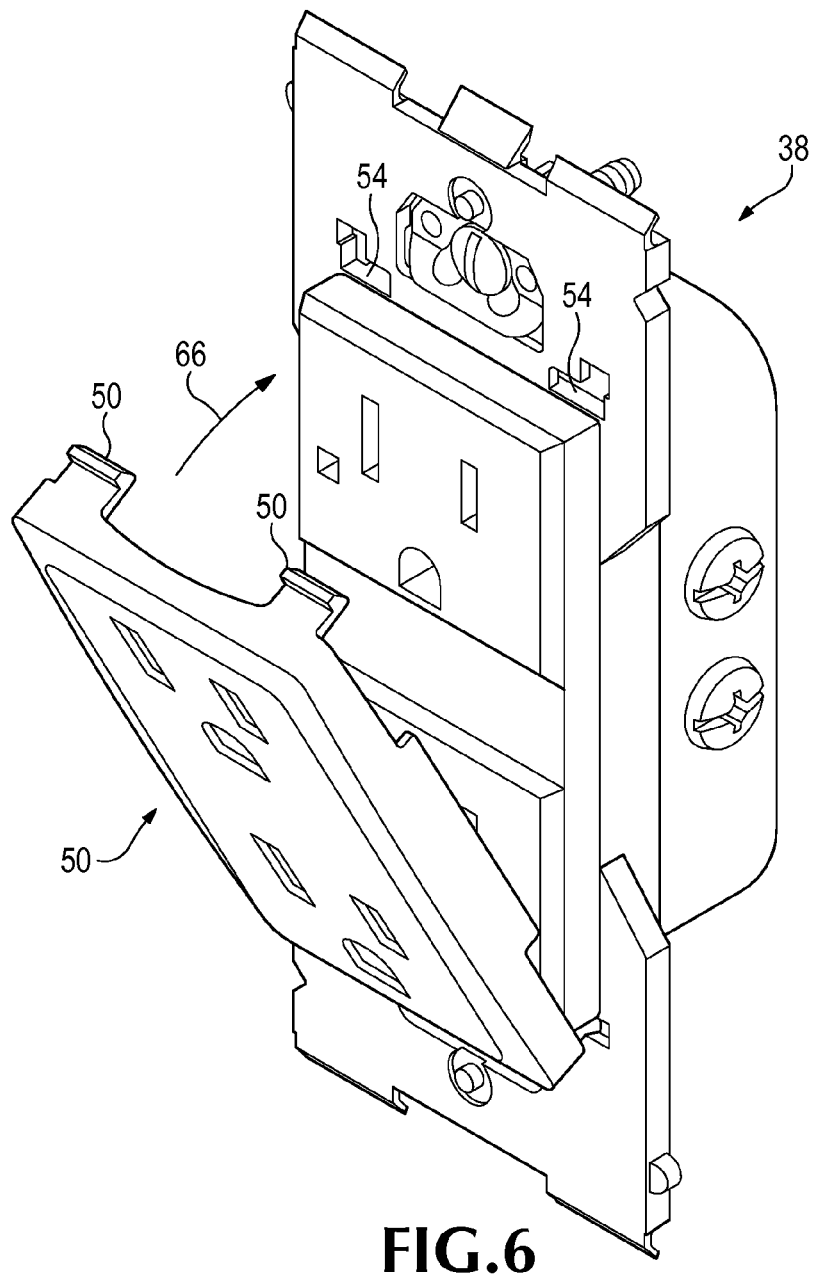
Figure 7:
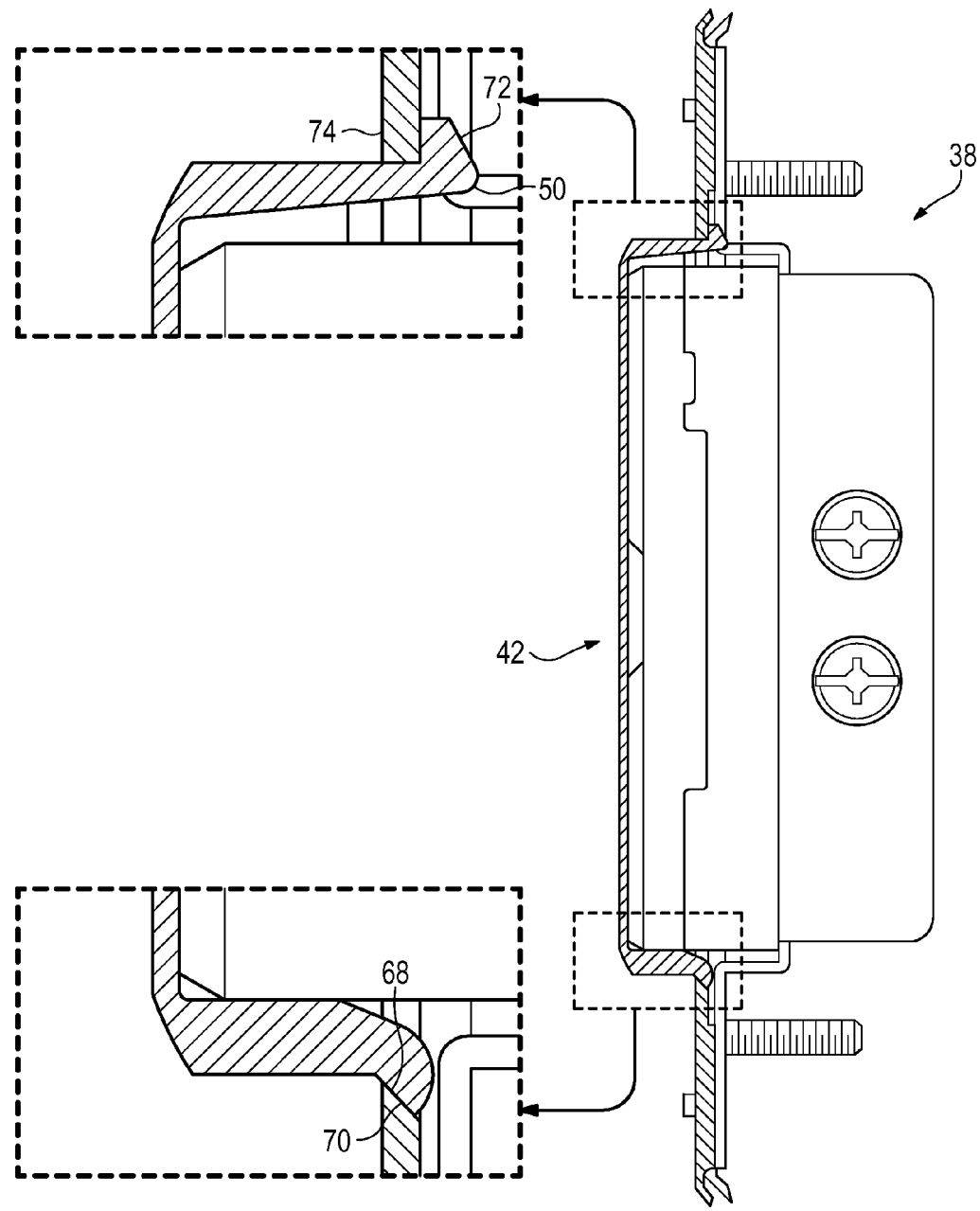

Once the hinge feet are engaged in the hinge openings, the cover 42 is pivoted upward in the direction of arrow 66 as shown in FIG. 6 until the snaps 50 latch into the snap openings 54 when the cover reaches the installed position as shown in the partial cutaway view of FIG. 7. Once the cover is in the installed position, the flat surface 68 of the hinge foot fully engages the beveled side 70 of the hinge opening as seen in the lower enlarged inset of FIG. 7. In this position, the hinge foot is held captive within the opening, thereby holding the lower part of the cover securely against the receptacle.

Figure 8:
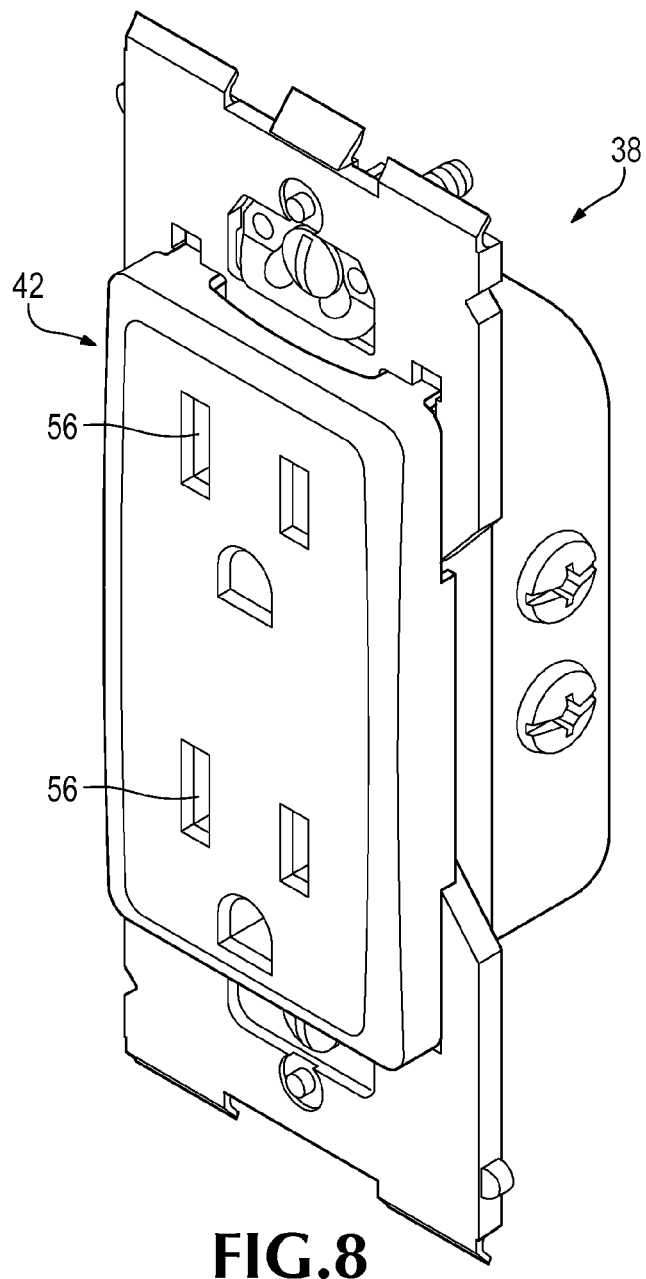

Referring to the upper enlarged inset of FIG. 7, when the cover pivots up to the fully installed position, the latch portion 72 of the snap 50 engages the back surface of a tab 74 that protrudes partially into the snap opening as described in more detail below. Thus, with the hinge feet and snaps securely engaged in the corresponding openings, the cover 42 is held firmly against the face of the receptacle as shown in FIG. 8 with the openings 56 in the cover lining up with the corresponding openings in the receptacle.

In the embodiment of FIGS. 3-8, the cover has a vertical dimension that is greater than the horizontal dimension. Locating the hinge feet and snaps at opposite ends of the cover in the longer direction may provide additional flexing action to help the snaps 50 bend enough to fit through the snap openings. The snaps have a certain amount of flexing ability due to their cantilevered construction. However, the entire cover may also flex to provide additional flexing range to the snaps. Placing the snaps and hinge feet at opposite sides of the long dimension of the cover may help maximize this additional flexing range. In other embodiments, however, the hinge feet and snaps may be located at opposite sides of the cover in the shorter direction.

Figure 9:
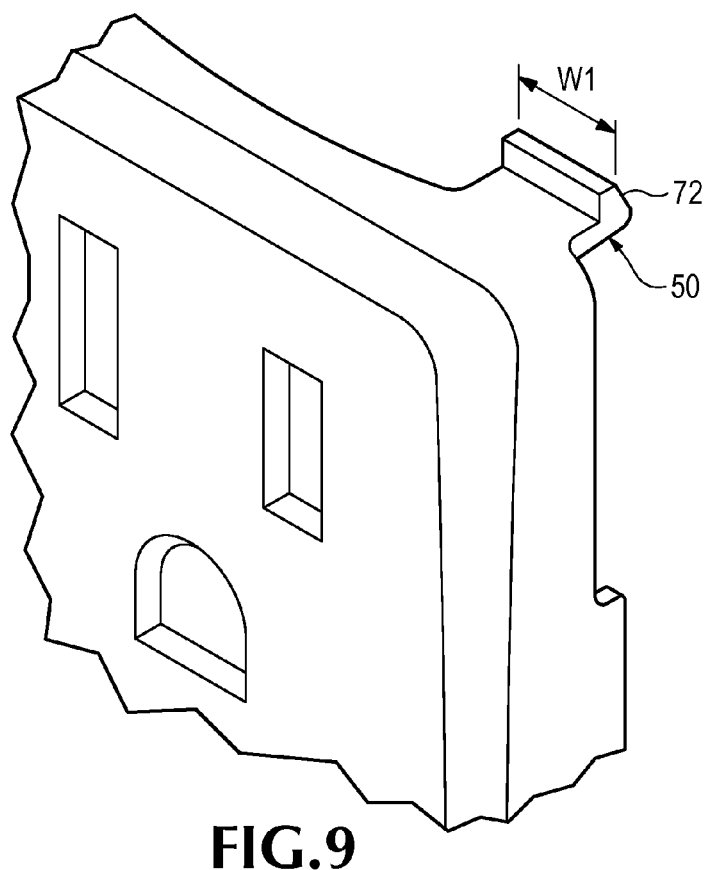
FIG. 9-11 illustrate an embodiment of a snap fastener according to some inventive principles of this patent disclosure.
Figure 10:
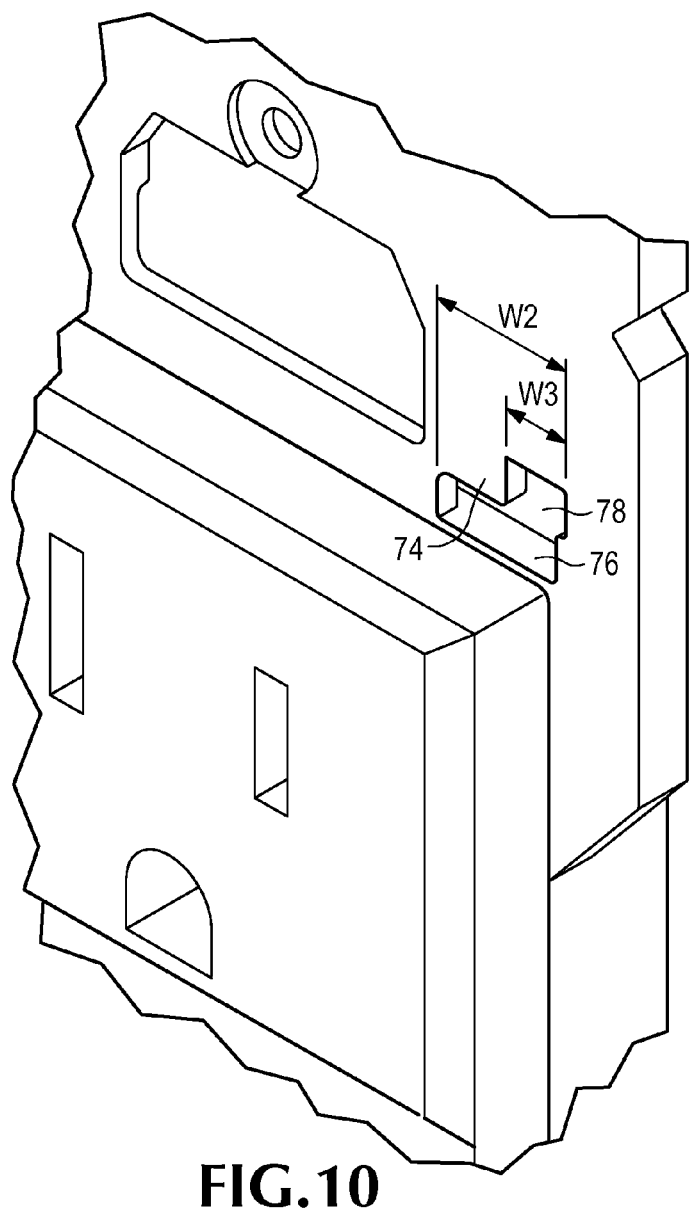
Figure 11:
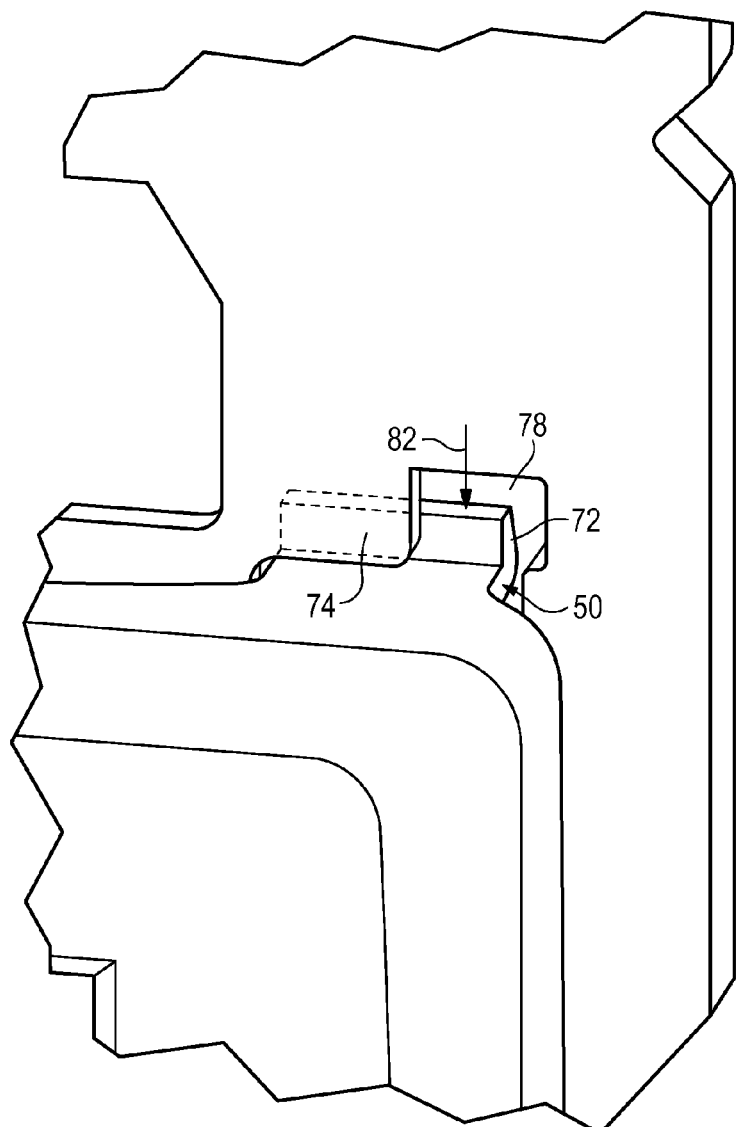

Referring to FIG. 9, the snap has a width W1 that is slightly smaller than the width W2 of the lower portion 76 of the snap opening shown in FIG. 10 to enable the snap to pass through the lower portion of the opening. The latch portion 72 of the snap 50 engage the back of tab 74 as shown in FIG. 11. Referring again to FIG. 10, the snap opening includes an upper portion having a smaller width W3 to facilitate removal of the cover. Referring to FIG. 11, the narrower upper portion 78 of the snap opening enables a pry tool to be inserted into the opening to pry the snap downward as shown by arrow 82 to release the snap and allow the cover to be removed in the reverse order of installation.

Some additional inventive principles of this patent disclosure relate to removable covers and color change kits for electrical devices having pushbuttons that are accessed through the cover. Although the inventive principles are not limited to any specific applications, one area of particular interest is fault circuit interrupting devices such as ground fault circuit interrupter (GFCI) devices, arc fault circuit interrupter (AFCI) devices, leakage current detection interrupter (LCDI) devices, etc. These fault detection and remediation devices typically include test and/or reset buttons that must be accessed through a front panel. The various types of up/down motion of these buttons may pose challenges to the use of removable covers because the buttons must pass through the cover without sticking. Some of these buttons may also be subjected to rocking, tilting and/or other types of motion that may pose further challenges.

Figure 12:
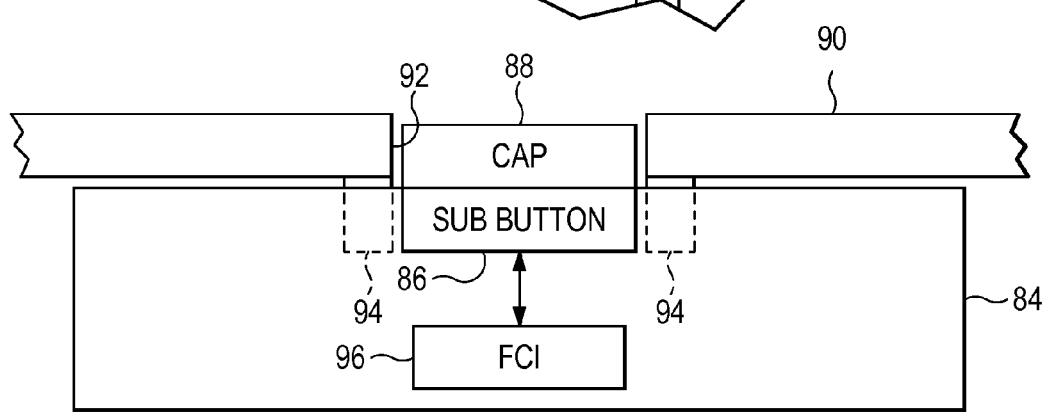
FIG. 12 illustrates an embodiment of a system for using a removable cover with an electrical device having a pushbutton according to some inventive principles of this patent disclosure.

FIG. 12 illustrates an embodiment of a system for using a removable cover with an electrical device having a pushbutton according to some inventive principles of this patent disclosure. The embodiment of FIG. 12 includes an electrical device 84 having a pushbutton that includes a sub button 86 and a cosmetic cap 88. A cover 90 is adapted to be removably attached to the electrical device 84 and has an opening 92 for accessing the pushbutton. The sub button 86 and cosmetic cap 88 are adapted so the cosmetic cap may be removably attached to the sub button. The system may also include a guide 94 arranged to guide the pushbutton in the opening of the cover. The embodiment of FIG. 12 also includes a fault circuit interrupting apparatus 96 that may actuate, and/or be actuated by, the pushbutton. The inventive principles, however, are not limited to use with fault circuit interrupting devices.

Figure 13:
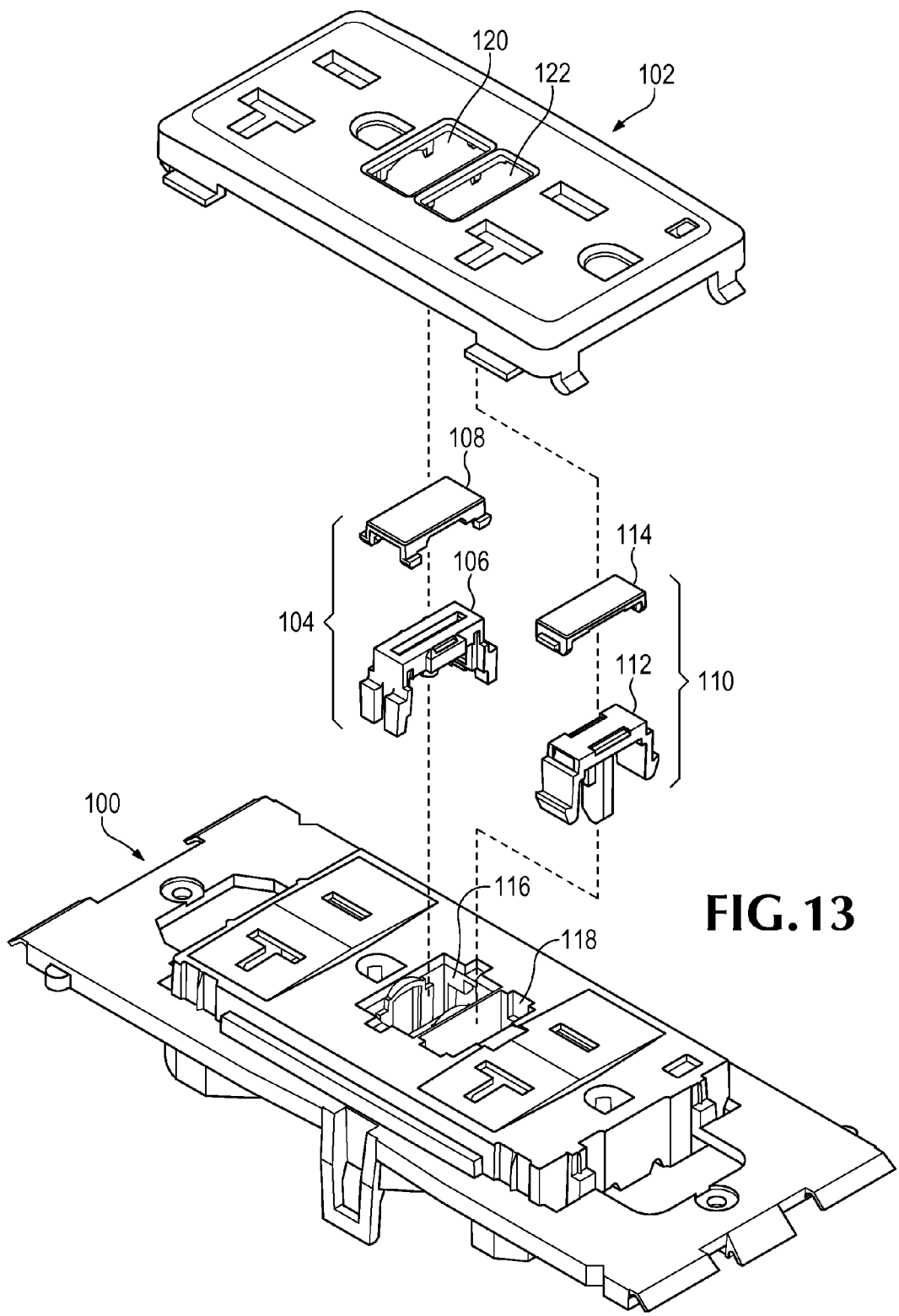
FIG. 13 illustrates an example embodiment of a system for using a removable cover with an electrical device having a pushbutton according to some inventive principles of this patent disclosure.

FIG. 13 illustrates an example embodiment of a system for using a removable cover with an electrical device having a pushbutton according to some inventive principles of this patent disclosure. The embodiment of FIG. 13 is described in the context of some specific device types and implementation details, but the inventive principles are not limited to these details. For example, the embodiment of FIG. 13 is described in the context of a duplex GFCI wiring device with reset and test buttons for the GFCI apparatus, but the inventive principles may be applied to other device types with different types of pushbuttons.

Referring to the exploded perspective view of FIG. 13, the GFCI wiring device includes a sub face 100 and a removable cover 102. A reset pushbutton 104 includes a reset sub button 106 and a cosmetic reset cap 108. A test pushbutton 110 includes a test sub button 112 and a cosmetic test cap 114. The reset pushbutton 104 is coupled to the GFCI apparatus through a first opening 116 in the sub face, while the test pushbutton 110 is coupled to the GFCI apparatus through a second opening 118 in the sub face. The cover 102 includes two openings 120 and 122 for accessing the two pushbuttons 104 and 106, respectively.

The cosmetic reset cap 108 and cosmetic test cap 114 can be removed and reattached to their respective sub buttons, while the sub buttons are constrained within the sub face 100. Thus, the cover 102 and cosmetic caps may provide a complete color change for the entire visible portion of the device.

Figure 14:
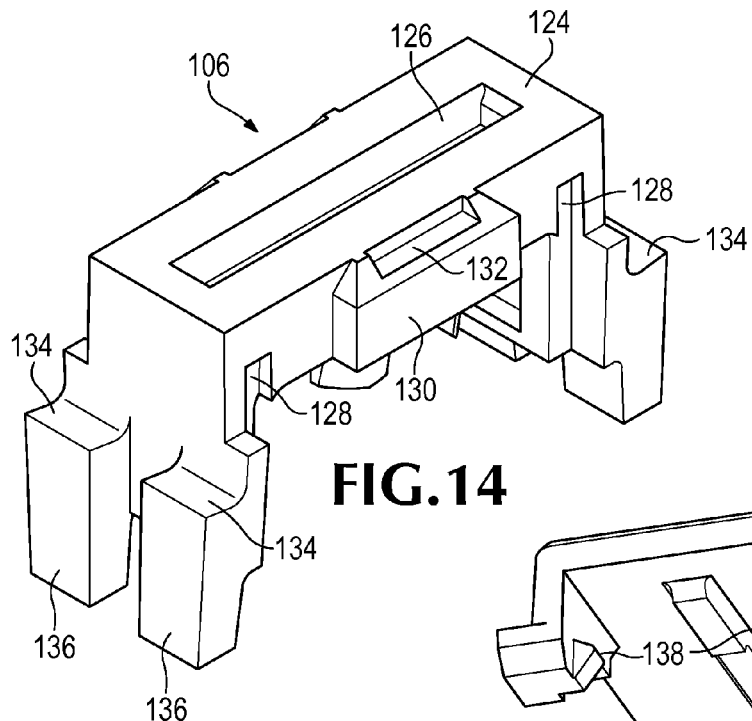
FIG. 14 illustrates an embodiment of a reset sub button according to some inventive principles of this patent disclosure.

FIG. 14 illustrates an embodiment of a reset sub button according to some inventive principles of this patent disclosure. The sub button 106 has a face portion 124 that may be pressed by a user in the absence of a cosmetic cap. The face portion has a slot 126 to receive an alignment and stiffening rib on the cosmetic test cap. Four recesses 128 are adapted to receive snaps on the test cap to enable the test cap to be snapped onto and off of the sub button. A flange 130 includes a pry cut 132 to facilitate removal of the test cap from the sub button.

The test sub button 106 also includes four flanges 134 that engage against corresponding stops on the sub face as the reset pushbutton is forced upward when the GFCI trips. This holds the reset sub button captive within the sub face even if the cosmetic test cap is not attached, thereby enabling the reset sub button to continue operating properly regardless of the presence or absence of the cosmetic caps and/or cover.

The flanges 134 are formed on four guides 136. The two guides on each end of the reset sub button straddle a corresponding rail on a subframe under the sub face to help prevent rocking and to guide the reset pushbutton as it moves up and down in response to the GFCI apparatus and user actuations.

Figure 15:
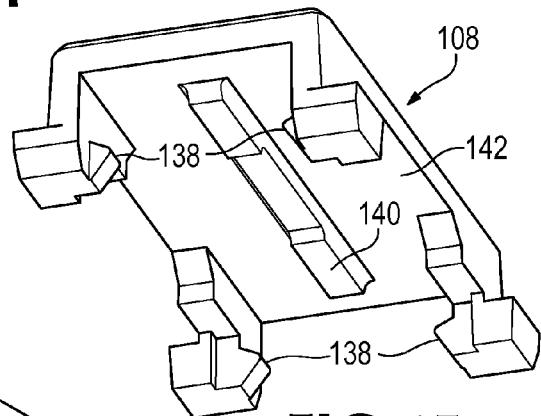
FIG. 15 illustrates an embodiment of a cosmetic reset cap according to some inventive principles of this patent disclosure.

FIG. 15 illustrates an embodiment of a cosmetic reset cap according to some inventive principles of this patent disclosure. The reset cap 108, which may be part of a color change kit and therefore available in a range of different colors, includes four snaps 138 that engage the recesses 128 of the reset sub button to hold the reset cap securely to the sub button. A stiffening rib 140 doubles as an alignment feature that aligns with, and slides into, the slot 126 on the reset sub button. A pry surface 142 provides a surface against which a pry tool may be seated to remove the reset cap from the reset sub button.

Figure 16:
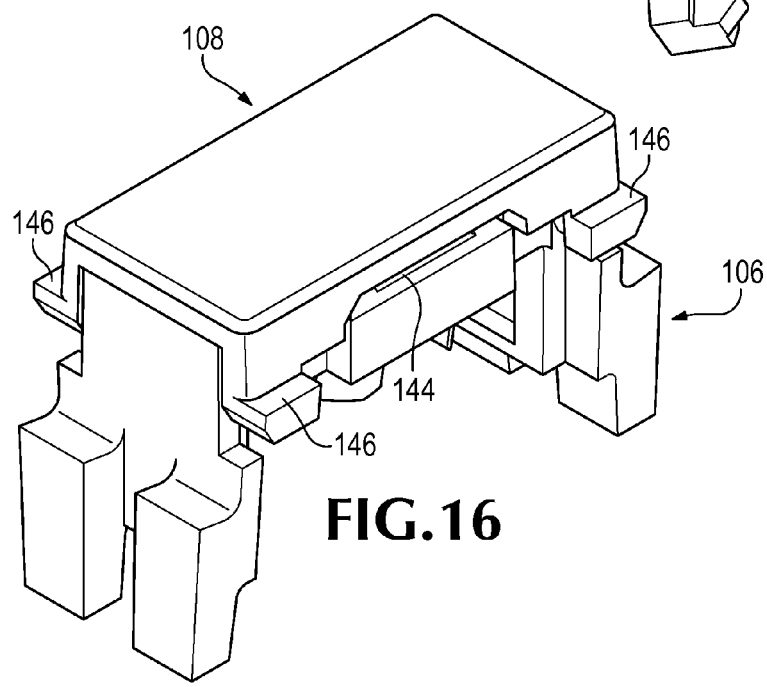
FIG. 16 illustrates a reset sub button and a cosmetic reset cap assembled into a reset pushbutton according to some inventive principles of this patent disclosure.

FIG. 16 illustrates the reset sub button 106 and cosmetic reset cap 108 assembled into a reset pushbutton. Visible in this view is a pry slot 144 formed between the pry cut of the sub button and the pry surface of the reset cap. The cosmetic reset cap 108 includes four flanges 146 that engage against a bottom surface of the removable cover to prevent the cap from being removed or flying off before the cover and any wall plate are removed.

Figure 17:
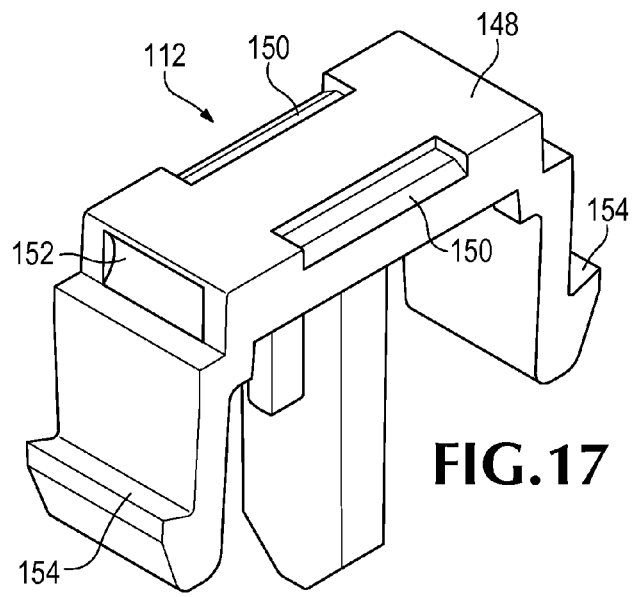
FIG. 17 illustrates an embodiment of a test sub button according to some inventive principles of this patent disclosure.

FIG. 17 illustrates an embodiment of a test sub button according to some inventive principles of this patent disclosure. The sub button 112 has a face portion 148 that may be pressed by a user in the absence of a cosmetic cap. The face portion has two pry cuts 150 to facilitate removal of the test cap from the test sub button. Two recesses 152 are adapted to receive snaps on the cosmetic test cap to enable the test cap to be snapped onto and off of the sub button.

The test sub button 112 also includes two flanges 154 that engage against corresponding stops on the sub face when the test pushbutton is forced upward by a spring. This holds the test sub button captive within the sub face even if the cosmetic test cap is not attached, thereby enabling the test sub button to continue operating properly regardless of the presence or absence of the cosmetic caps and/or cover.

Figure 18:
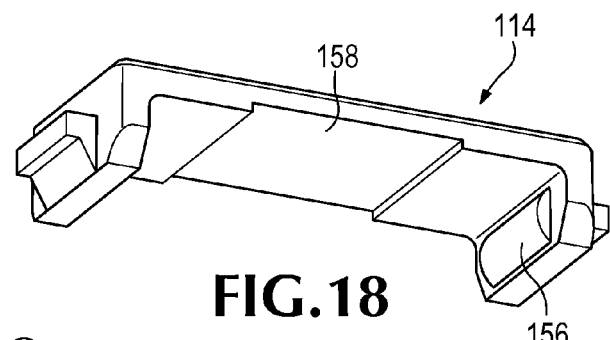
FIG. 18 illustrates an embodiment of a cosmetic test cap according to some inventive principles of this patent disclosure.

FIG. 18 illustrates an embodiment of a cosmetic test cap according to some inventive principles of this patent disclosure. The test cap 114, which may be part of a color change kit and therefore available in a range of different colors, includes two snaps 156 that engage the recesses 152 of the test sub button to hold the test cap securely to the sub button. A pry cut 158 aligns with the pry cuts 150 on the test sub button to provide a space for inserting a screwdriver tip or other prying tool to remove the test cap from the test sub button.

Figure 19:
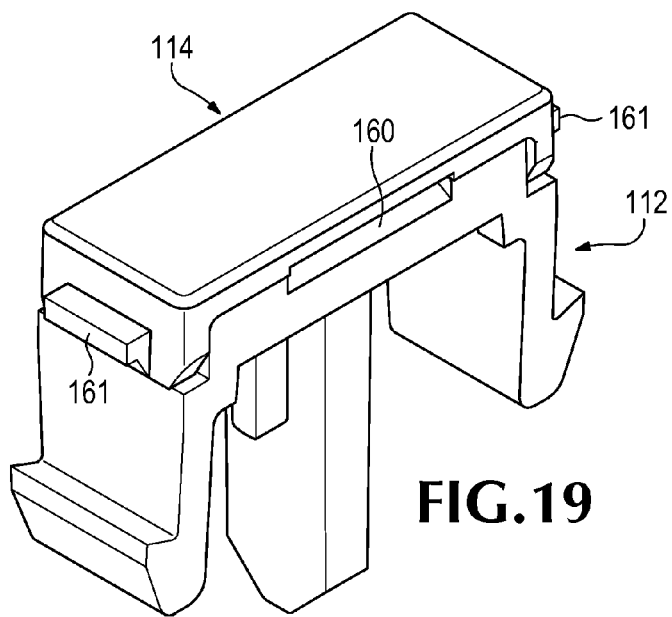
FIG. 19 illustrates a test sub button and a cosmetic test cap assembled into a test pushbutton according to some inventive principles of this patent disclosure.

FIG. 19 illustrates the test sub button 112 and cosmetic test cap 114 assembled into a test pushbutton. The space 160 formed between the pry cut 158 on the test cap and the pry cut 150 on the test sub button is visible in this view. The cosmetic test cap 114 includes two flanges 161 that engage against a bottom surface of the removable cover to prevent the cap from being removed or flying off before the cover and any wall plate are removed.

Figure 20:
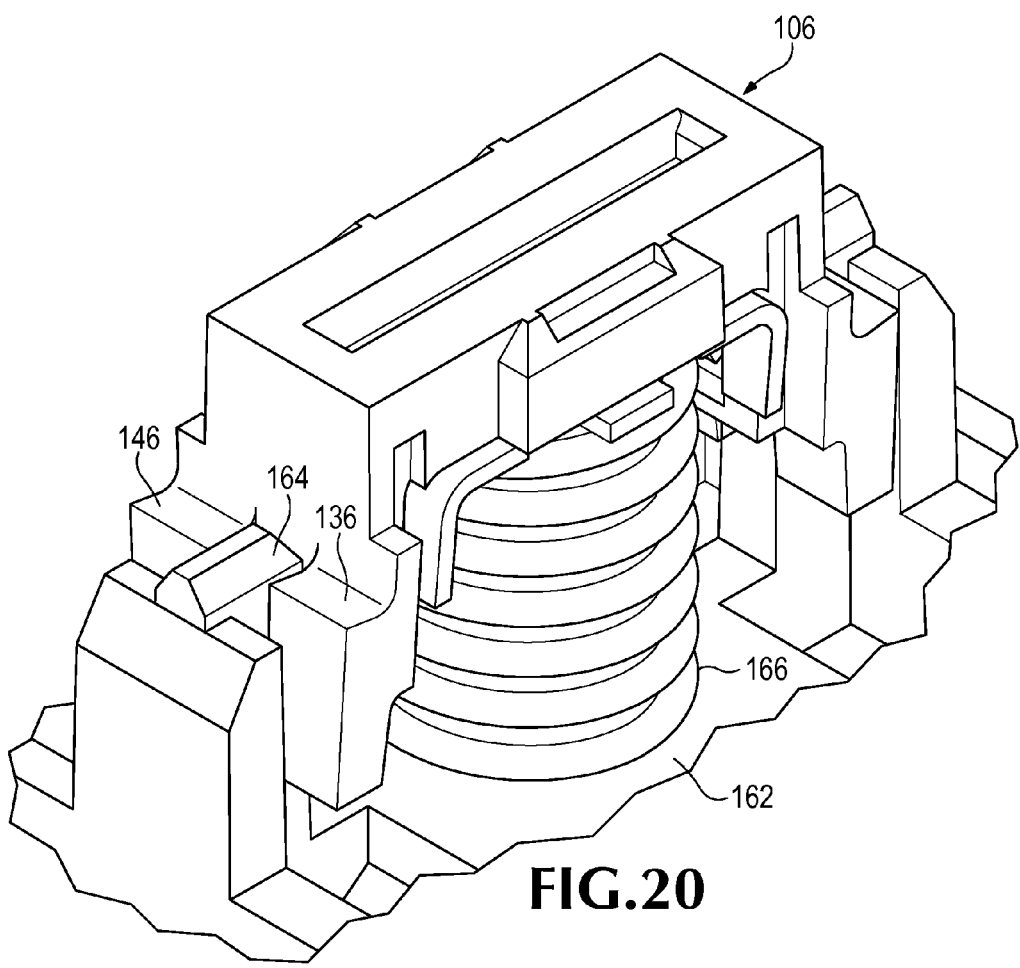
FIG. 20 illustrates a reset sub button engaged with a subframe according to some inventive principles of this patent disclosure.

FIG. 20 illustrates the reset sub button 106 engaged with a subframe 162 according to some inventive principles of this patent disclosure. The subframe, which supports the sub face 100, includes rails 164 which are straddled by guides 136 on the reset sub button 106 as it is actuated by, and pushes down on, a spring and plunger mechanism 166 for the GFCI reset feature.

Figure 21:
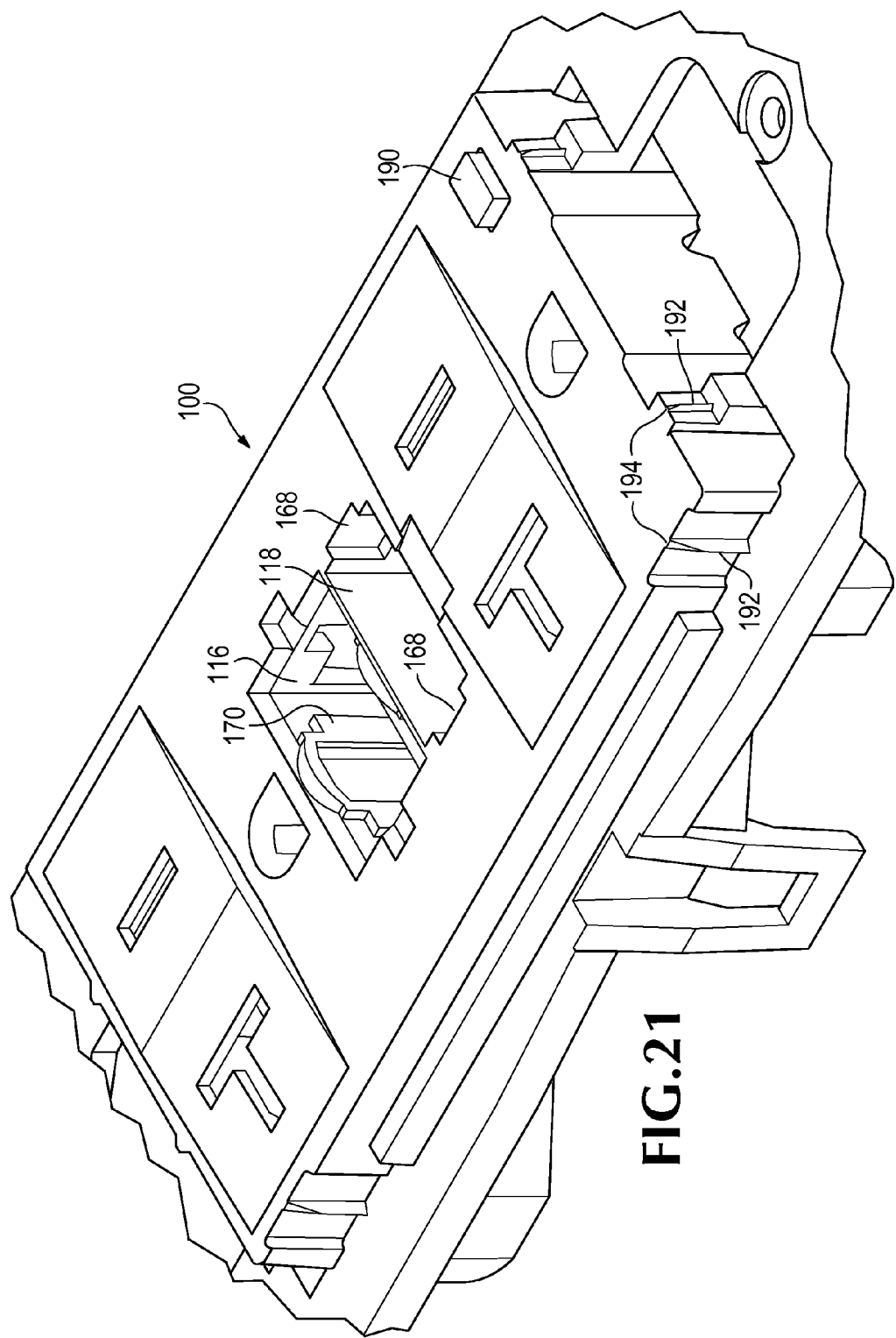
FIG. 21 illustrates the passages for pushbuttons in a sub face according to some inventive principles of this patent disclosure.

FIG. 21 illustrates the passages 116 and 118 for the reset and test pushbuttons, respectively, in the sub face 100 before assembly with the sub buttons. The simple sidewalls of the passage 118 act as guides for the test sub button and cosmetic test cap. Recesses 168 accommodate the flanges 161 of the cosmetic test cap. The passage 116 for the reset pushbutton includes guides 170 that may form a continuation of guides that project from the back of the removable cover as described in more detail below.

Figure 22:
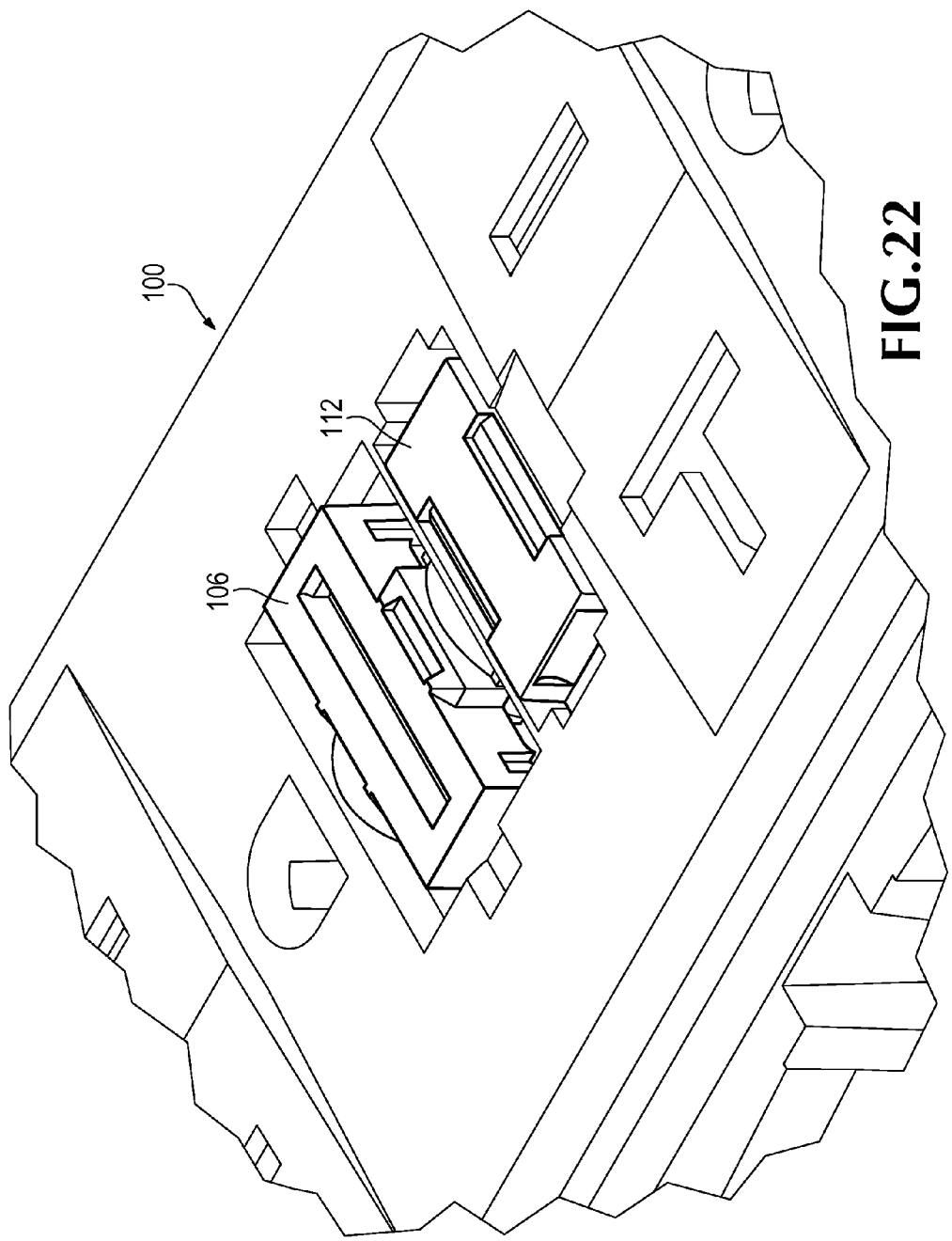
FIG. 22 illustrates a sub face with a reset sub button and a test sub button installed, but without cosmetic caps or a cover according to some inventive principles of this patent disclosure.

FIG. 22 illustrates the sub face 100 with the reset sub button 106 and the test sub button 112 installed, but without the cosmetic caps or the cover. In this configuration, the reset sub button 106 and the test sub button 112 may be fully functional, regardless of the presence or absence of the cosmetic caps and/or cover. Thus, the GFCI wiring device may continue to operate at full functionality, even if the color change kit is removed and not replaced.

Figure 23:
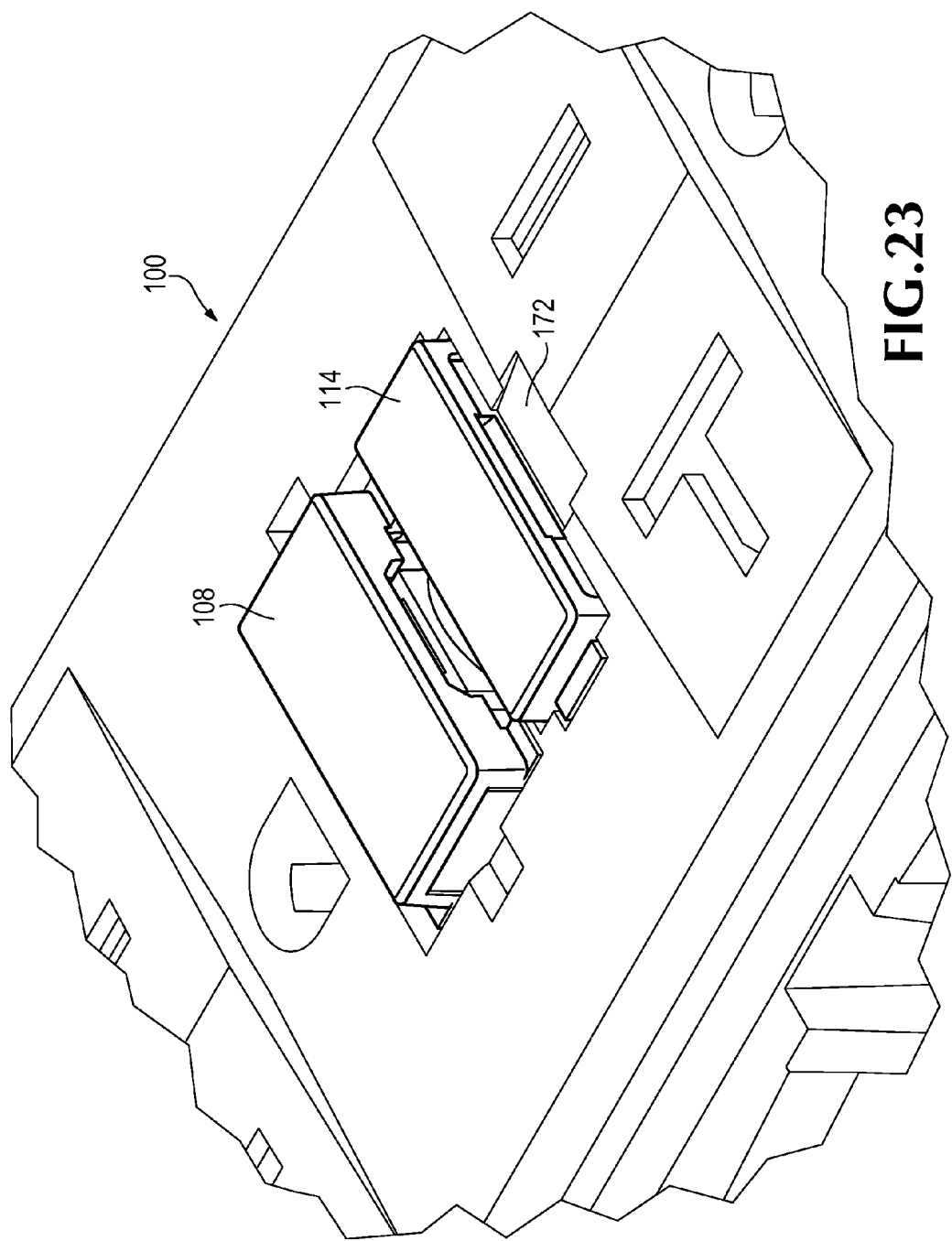
FIG. 23 illustrates a sub face with a cosmetic reset cap and a cosmetic test cap installed on their respective sub buttons, but without a cover installed according to some inventive principles of this patent disclosure.

FIG. 23 illustrates the sub face 100 with the cosmetic reset cap 108 and the cosmetic test cap 114 installed on their respective sub buttons, but without cover installed. The sub face includes a pry ramp 172 that facilitates insertion of a pry tool into the pry space between the respective pry cuts of the test sub button 112 and the cosmetic test cap 114. Depending on the implementation details, the ramp may be beneficial for the test cap but not the reset cap due to the relative height requirements of the two pushbuttons. In this configuration, the pushbuttons may be fully functional, regardless of the presence or absence of the cover.

Figure 24:
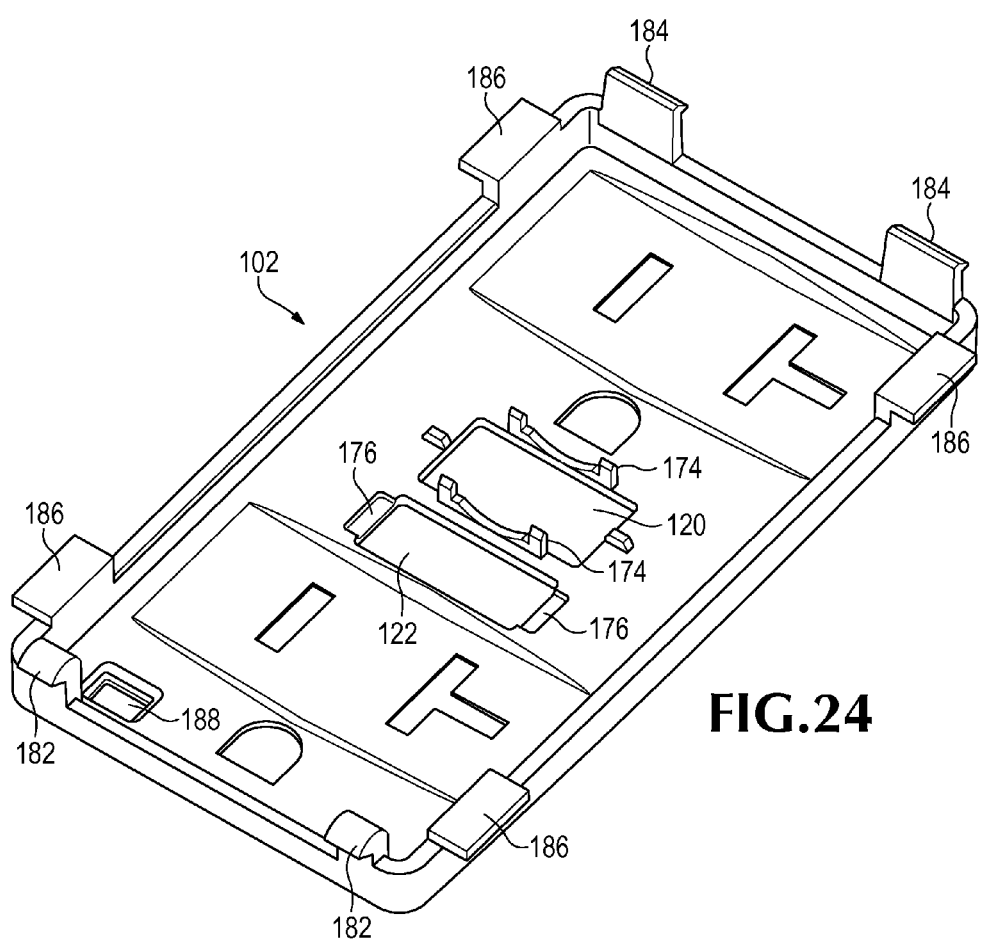
FIG. 24 illustrates an embodiment of a removable cover according to some inventive principles of this patent disclosure.

FIG. 24 illustrates an embodiment of a removable cover 102 according to some inventive principles of this patent disclosure. The view of FIG. 24 illustrates the back of the cover, which includes two guide walls 174 that project downward from the back surface of the cover on either side of the opening 120 for the reset pushbutton. The guide walls trap and guide the reset pushbutton so the pushbutton does not get hung up on the cover when tripping or resetting. This also helps prevent the reset pushbutton from hindering installation and removal of the cover when the cosmetic caps are installed on the sub buttons. Also visible in FIG. 24 are two recesses 176 on opposite sides of the opening 122 for the test pushbutton to accommodate the flanges 161 on the cosmetic test cap 114.

Figure 25:
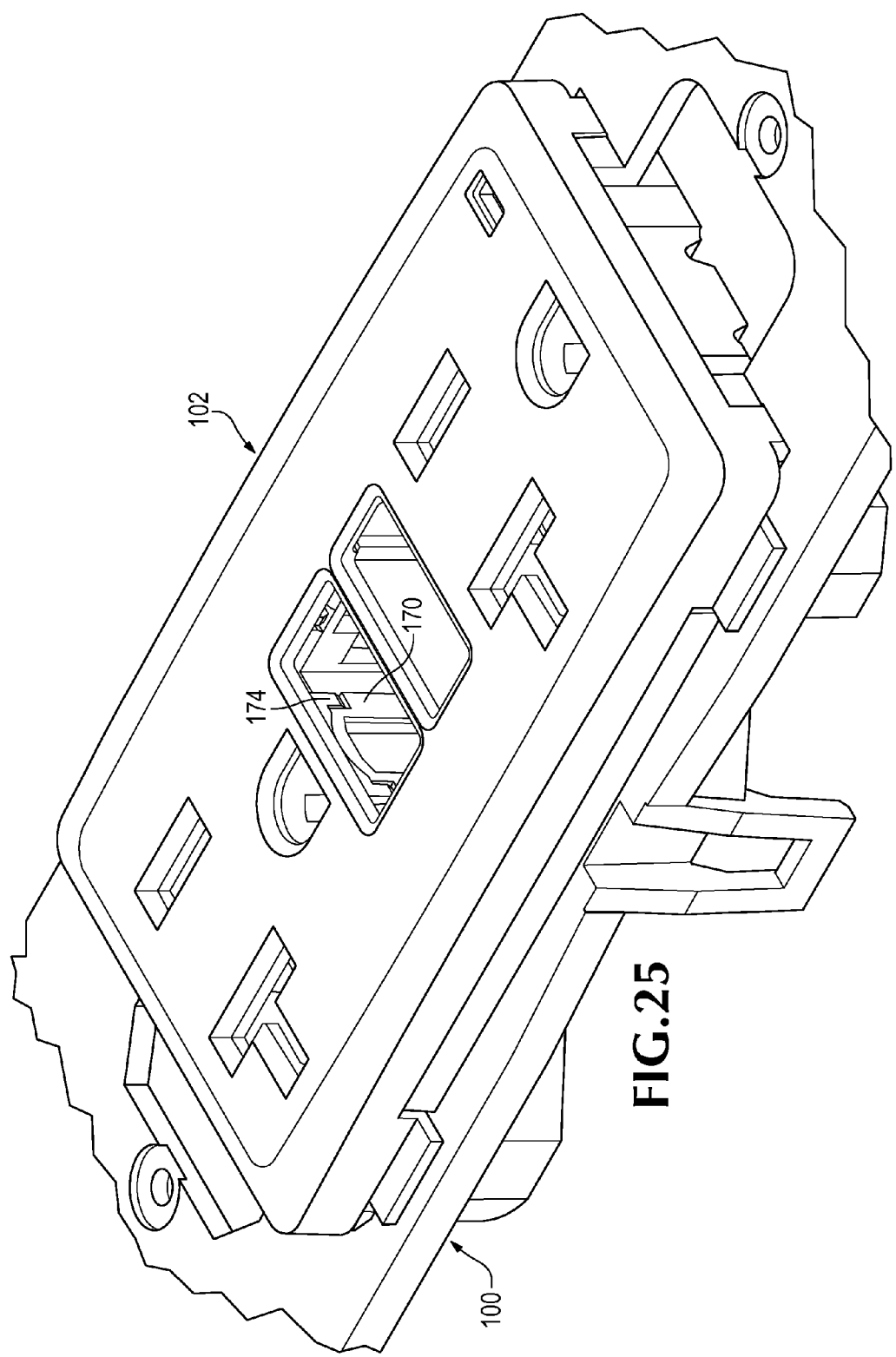
FIG. 25 illustrates how the openings of a removable cover align with passages in a sub face when the cover is installed on a sub face according to some inventive principles of this patent disclosure.

FIG. 25 illustrates how the openings 120 and 122 in the removable cover 102 align with the passages 116 and 118 in the sub face 100 when the cover is installed on the sub face. In this view the pushbuttons are left out to prevent obscuring the details of interest. The guide walls 174 of the cover align with the guide surfaces 170 of the reset passage to form a continuous guide to prevent either the reset sub button or the cosmetic reset cap from becoming misaligned or getting stuck on the cover.

Figure 26:
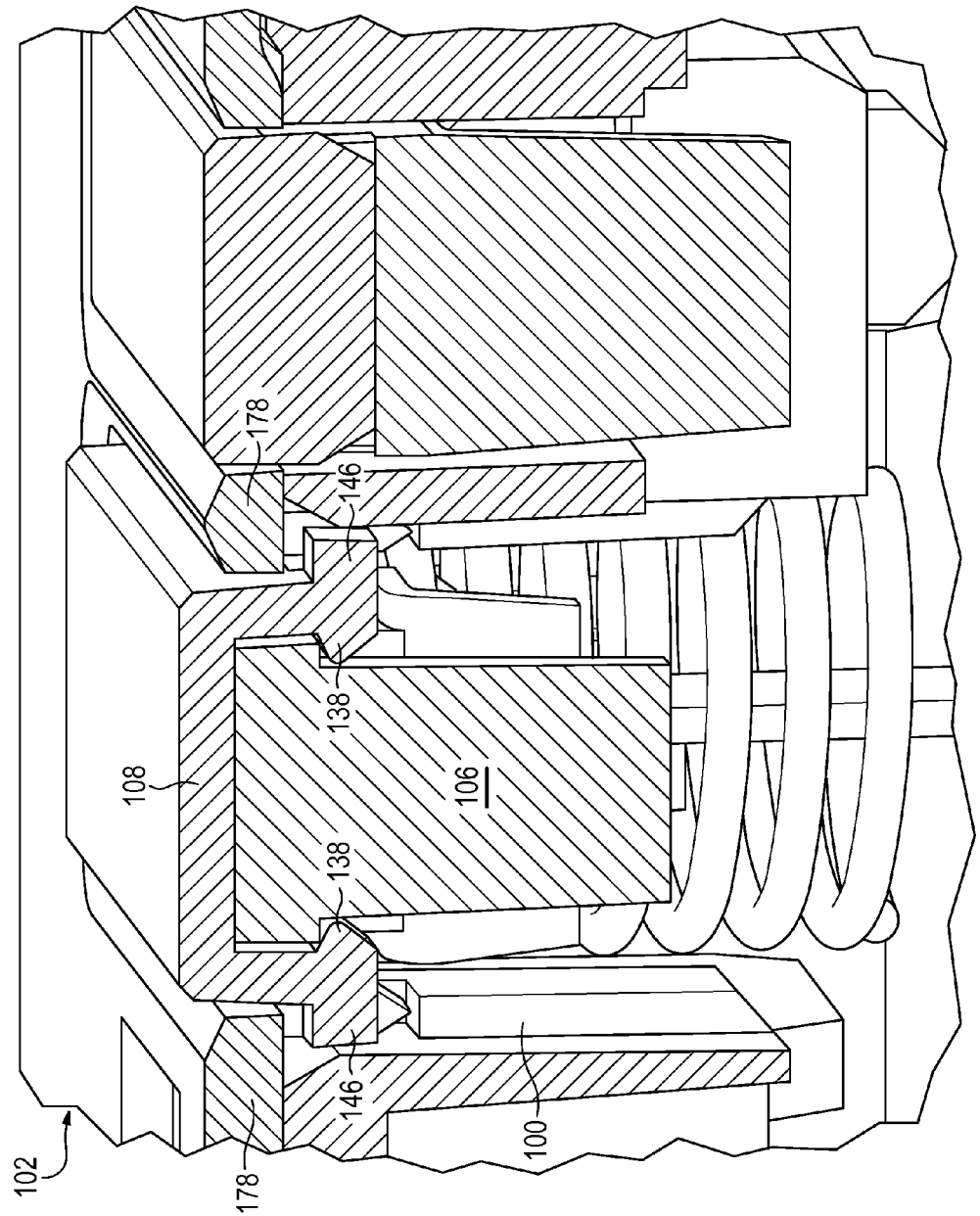
FIG. 26 is a cross sectional perspective view illustrating a sub face, a reset sub button, a cosmetic reset cap, and a cover fully assembled according to some inventive principles of this patent disclosure.

FIG. 26 is a cross sectional perspective view illustrating the sub face 100, the reset sub button 106, the cosmetic reset cap 108, and the cover 102 fully assembled. The view of FIG. 26 shows the snaps 138 of the reset cap engaged in the recesses of the sub button. In this view, the reset pushbutton is in the extended or tripped position. As is apparent from this view, the flanges 146 of the reset cap are trapped by rims 178 of the cover 102.

Figure 27:
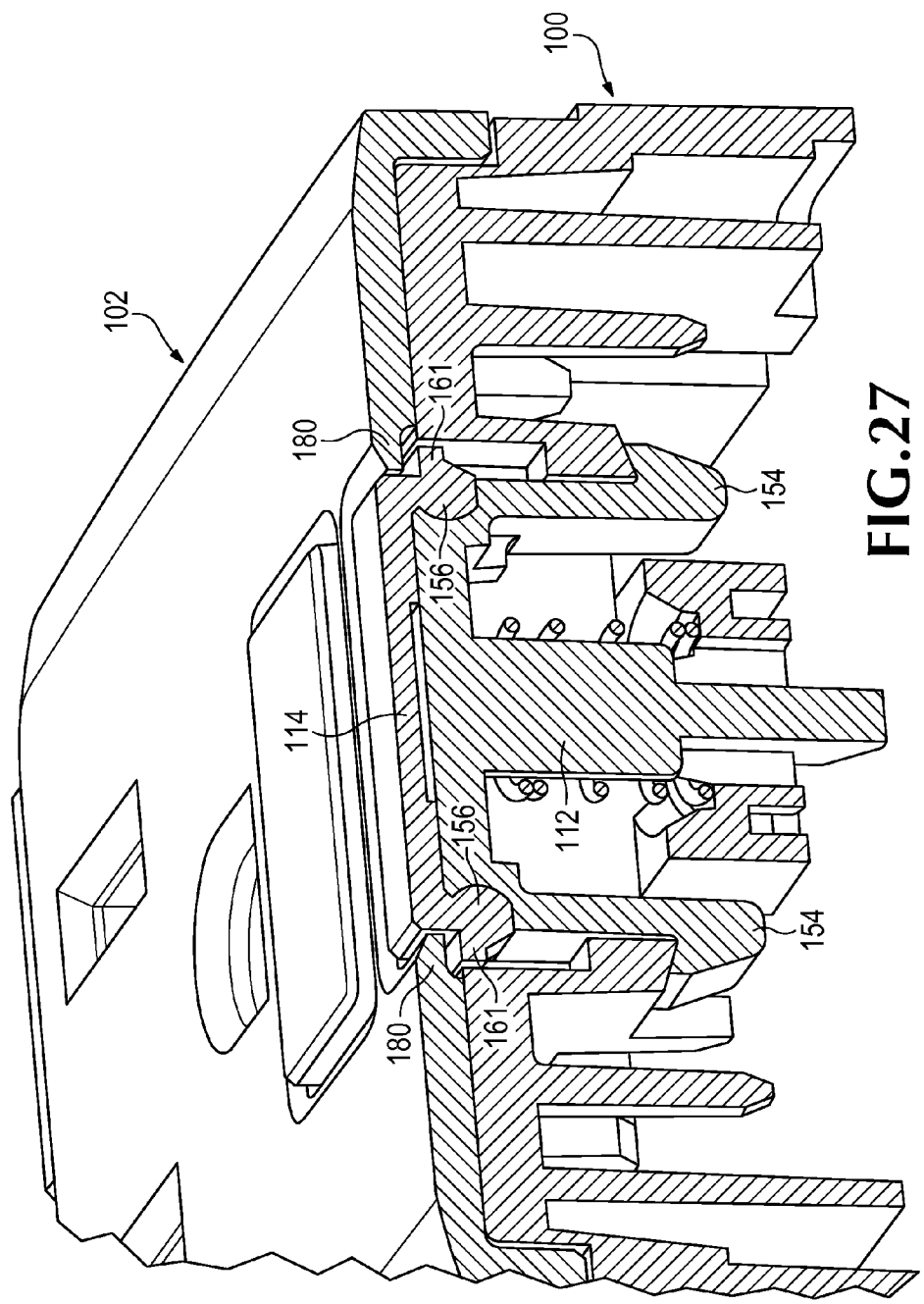
FIG. 27 is a cross sectional perspective view illustrating a sub face, a test sub button, a cosmetic test cap, and a cover fully assembled according to some inventive principles of this patent disclosure.

FIG. 27 is a cross sectional perspective view illustrating the sub face 100, the test sub button 112, the cosmetic test cap 114, and the cover 102 fully assembled. The view of FIG. 27 shows the snaps 156 of the test cap engaged in the recesses of the sub button. Also visible in this view, the two flanges 154 of the test sub button are engaged against stops on the sub face 100. As is apparent from this view, the flanges 161 of the reset cap are trapped by rims 180 of the cover 102.

Some additional, independent, refinements to the embodiments of FIGS. 13-27 are as follows.

Referring to FIG. 24, the cover 102 is arranged as a pivoting cover having hinge feet 182 and snaps 184 to engage corresponding openings in the sub face in the same manner as the embodiments described above with respect to FIGS. 3-11. Although the inventive principles relating to the pivoting cover are independent from those relating to the cover for use with devices having pushbuttons, they are combined here to provide a synergistic result that may enable easy removal and/or installation of a cosmetic cover while still holding tight to lower mating parts.

Referring again to FIG. 24, the cover may include retainer tabs 186 disposed at various points along the rim of the cover to prevent the cover from being removed unless any wall plate that may be installed over the electrical device is removed first.

The cover may also include an opening 188 for a light pipe. The opening may have beveled sides to guide the light pipe into the opening as the cover is moved into the installed position. Referring to FIG. 21, the light pipe 190, which typically is resilient enough to sway somewhat, may protrude through a slightly oversized opening in the sub face 100. This may give the light pipe enough lateral free play to be easily guided into the opening 188 in the cover by the beveled sides, thus allowing the light pipe to fit without hindering alignment of the cover, while keeping the light pipe tight after installation.

A further refinement visible in FIG. 21 includes flexing features 192 which, in this embodiment, are formed as ribs 192 projecting outward from the raised portion of the sub face 100. These flexing features are arranged to flex one or more sides of the removable cover as the removable cover is pivoted into the installed position. Placing two ribs on opposite sides of the raised portion may force two opposing sides of the removable cover to flex outward in opposite directions, thereby causing the front of the cover to flex slightly downward against the sub face. This, in turn, may cause the front of the cover to fit tightly against the front of the sub face, thereby improving the contact and vertical alignment between the two parts, as well as the pushbuttons.

Figure 28:
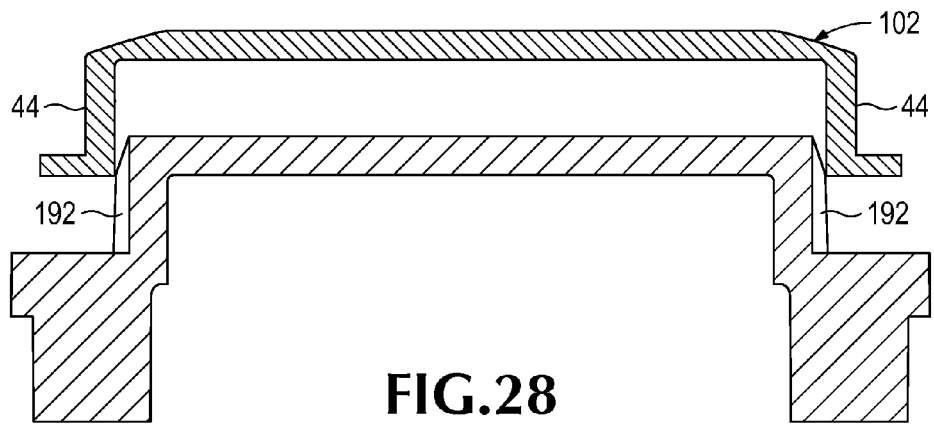
FIG. 28 is a cross sectional perspective view illustrating the engagement of a removable cover with flexing features according to some inventive principles of this patent disclosure.
Figure 29:
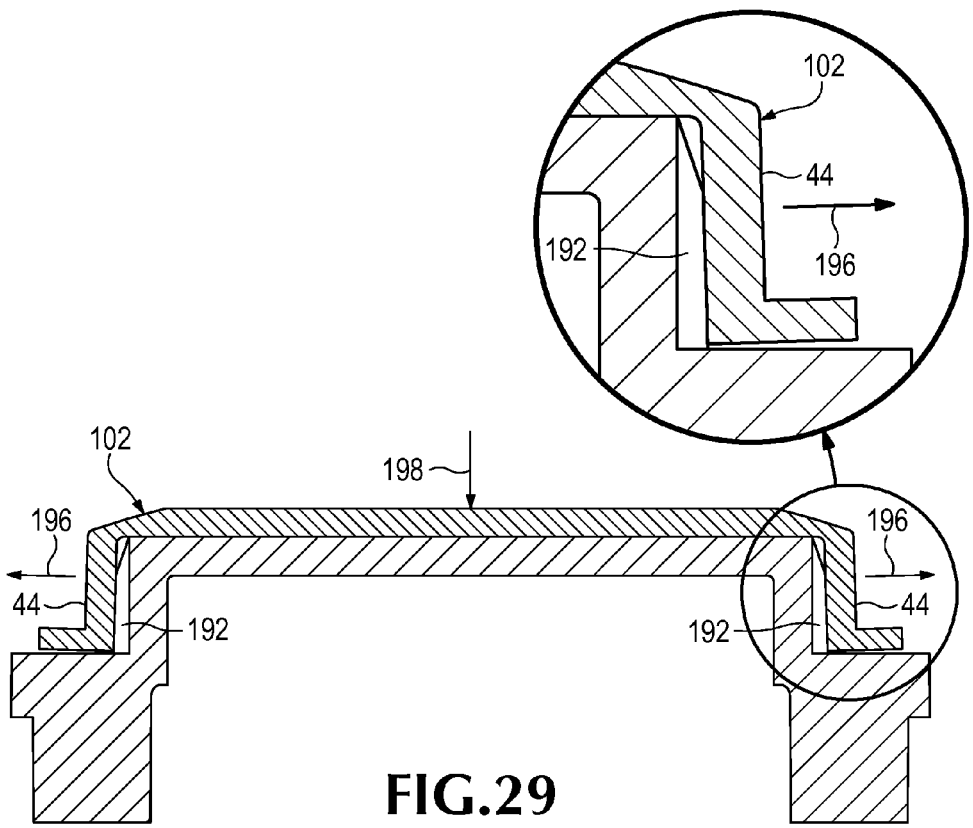
FIG. 29 is another cross sectional perspective view illustrating the engagement of a removable cover with flexing features according to some inventive principles of this patent disclosure.
Figure 30:
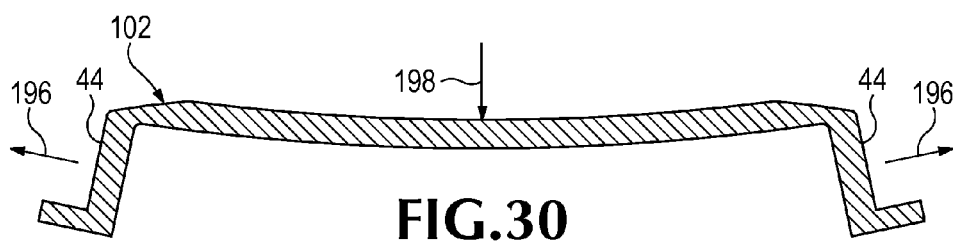
FIG. 30 is a cross sectional view illustrating flexing action of a cover to some inventive principles of this patent disclosure.

FIGS. 28 and 29 illustrate how the ribs 192 may engage with the cover 102 when the cover is installed on the electrical device. In the view of FIG. 28, the sides 44 of the cover 102 are beginning to engage the ramps 194 of the ribs 192 as the cover is pushed into position. In the view of FIG. 29, the cover is in the installed position, and the ribs 192 force the sides 44 of the cover outward as shown by arrows 196, thereby causing the front of the cover to flex slightly downward against the sub face as shown by arrow 198. FIG. 30 shows this flexing action to an exaggerated extent on a cross section to illustrate the dynamics of the flexing action.

The ribs also serve to align the removable cover horizontally with the sub face and other components. The ribs may be located around all or a part of the raised portion of the sub face. For example, two ribs may be placed at each corner as shown in FIG. 21 for at total of eight ribs. The use of ribs with relatively sharp edges may help eliminate misalignment and/or installation problems caused by dust, dirt or other debris, since the edges may tend to cut or push through debris as the cover is installed. As shown in FIG. 21, the ribs may be formed with ramps 194 to provide an easier start to the engagement of the ribs with the rim of the cover.

The inventive principle described above may be used individually or in various combinations to implement color change kits or other removable replaceable faces for electrical devices. The inventive principles may provide consistent alignment of moving parts in a manner that may cause the cover and cosmetic caps to look and feel as if they are one piece with their respective mating parts.

The inventive principles of this patent disclosure have been described with reference to some specific example embodiments, but these embodiments can be modified in arrangement and detail without departing from the inventive concepts. For example, in some embodiments, removable cosmetic caps have been shown having snaps that engage recesses on sub buttons, but the recesses could alternatively be placed on the caps, with the snaps located on the sub buttons. Moreover, even though snaps provide a particularly convenient technique for removably attaching the cosmetic caps to the sub buttons, other types of fastening techniques may be used.

Thus, any changes and modifications are considered to fall within the scope of the following claims.

The invention claimed is:

1. An interchangeable cover for an electrical receptacle, the electrical receptacle having a face with a plurality of receptacle openings, the cover comprising:
  front and back surfaces and having a top and bottom end and two sides;
  a plurality of cover openings corresponding to the plurality of receptacle openings, the plurality of cover openings extending through the front and back surfaces of the cover, wherein the plurality of cover openings are positioned to be in alignment with the plurality of receptacle openings when the cover is interchangeably attached to the receptacle face;

one or more pivotable hinge feet arranged on the back surface of the cover and proximate the bottom end, the one or more pivotable hinge feet being sized and configured to pivotally engage one or more corresponding retention openings on the receptacle face; and one or more cover fastening features arranged on the back surface of the cover and proximate the top end, the one or more fastening features being sized and configured to removably engage one or more corresponding receptacle fastening features on the receptacle face such that the interchangeable cover remains attached to the receptacle face when the cover is in an installed position.

2. The cover of claim 1 where the one or more fastening features includes a resilient fastening feature.

3. The cover of claim 2 where the resilient fastening feature comprises a snap adapted to engage an opening on the electrical device.

4. The cover of claim 1 where:
the distance between the two ends is greater than the distance between the two sides.

5. The cover of claim 1 where:
the cover has a long dimension and a short dimension; and
the cover is adapted to pivot in the long dimension.

6. The cover of claim 1 where:
the cover has a long dimension and a short dimension; and
the cover is adapted to pivot in the short dimension.

7. The cover of claim 1 further comprising a retaining feature to prevent removal of the cover from the electrical device while a wall plate is installed over the electrical device.

8. The cover of claim 1 where:
the cover includes a top plate to cover a portion of the electrical device and two sides depending downwardly from the top plate at opposite peripheries of the top plate; and
the cover is constructed so the top plate flexes downward in response to outward flexing of one or both of the two sides.

9. An electrical device comprising:
a plurality of receptacle openings on a face of the electrical device, the electrical device having a raised portion;
one or more retention openings on the face of the electrical device to form a pivot point and being sized and positioned to pivotally engage one or more corresponding hinge feet on a removable cover; and one or more fastening features on the electrical device positioned to engage one or more fastening features located on a back surface of the removable cover such that the cover remains attached to the receptacle face when the cover is in an installed position.

10. The electrical device of claim 9 where the electrical device comprises: a plane on which the one or more retention features and one or more fastening features are located; and
the raised portion projects from the plane.

11. The electrical device of claim 9 where the raised portion includes one or more flexing features arranged to flex one or more sides of the removable cover as the removable cover is pivoted into the installed position.

12. The electrical device of claim 11 where the one or more flexing features includes a rib projecting outward from the raised portion.

13. The electrical device of claim 12 where the rib includes a ramp to engage one of the sides of the removable cover as the removable cover is pivoted into the installed position.

14. The electrical device of claim 11 where the one or more flexing features includes two ribs projecting outward in opposite directions on opposite sides of the raised portion to force two sides of the removable cover to flex outward in opposite directions.

15. The electrical device of claim 9 where the one or more retention openings includes an opening having a beveled side.

16. A system comprising:
an electrical device having a face with a plurality of receptacles opening and a raised portion; and a removable cover having a plurality of cover openings alignable with the plurality of receptacle openings to allow access to the receptacle openings, the cover being alignable with the raised portion; retention openings located on the electrical device and hinge feet located on the removable cover to enable the removable cover to pivot into an installed position on the electrical device.

17. system of claim 16 where:
the electrical device comprises a raised portion ; and
the removable cover comprises a rim arranged to overlap the raised portion when the removable cover is in the installed position.

18. The system of claim 17 where the rim includes one or more cutouts for clearance around one or more features of the electrical device.

19. The system of claim 16 where:
the retention openings and the hinge feet sized and positioned so the hinge feet may be engaged with the retention openings when the cover is at an angle to the electrical device; and
the retention openings and the hinge feet are adapted so the hinge is hinge feet are retained by the retention openings when the cover is in the installed position.

20. The system of claim 16 where
the removable cover comprises a first resilient fastening feature; and
the electrical device comprises a second resilient fastening feature adapted to engage the first resilient fastening feature to secure the removable cover in the installed position.

21. An electrical device comprising:
one or more fastening openings sized and configured to removably receive corresponding fastening structures on an interchangeable cover for the electrical device, the electrical device having a face and the fastening structures residing on the face to fasten the interchangeable cover to the face; and
a sub button on the electrical device having a flexing structure sized and positioned to removably attach a cosmetic cap having a corresponding fastening feature to the sub button, the interchangeable cover having an opening positioned to align with the sub button to allow access to the sub button when the interchangeable cover is in an installed position;
where the sub button is arranged to function as a pushbutton with or without the cosmetic cap attached to the sub button.

22. The electrical device of claim 21 where the fastening feature of the sub button comprises a snap feature.

23. The electrical device of claim 22 where the snap feature comprises a recess.

24. The electrical device of claim 21 where the sub button comprises a removal feature to assist removal of the cosmetic cap from the sub button.

25. The electrical device of claim 24 where the removal feature comprises a pry cut.

26. The electrical device of claim 21 further comprising a guide arranged to guide the sub button as the sub button is actuated.

27. The electrical device of claim 26 where the guide comprises a rail arranged to engage a slot on the sub button.

28. The electrical device of claim 26 further comprising a stop arranged to limit the motion of the sub button.

29. The electrical device of claim 28 where the stop comprises a ledge arranged to engage a ledge on the sub button.

30. The electrical device of claim 21 further comprising a sub face having an opening arranged to align with the sub button.

31. The electrical device of claim 30 where sub face includes a removal feature to assist removal of the cosmetic cap from the sub button.

32. The electrical device of claim 31 where the removal feature comprises a pry ramp.

33. The electrical device of claim 31 where the sub face includes one or more guide walls arranged to guide the sub button as it moves inward and outward.

34. The electrical device of claim 31 further comprising a light guide arranged to engage an opening in the cover.

35. The electrical device of claim 21 where:
the electrical device comprises a fault circuit interrupter; and
the sub button is arranged as a test or reset button for the fault circuit interrupter.

36. The electrical device of claim 21 where:
the electrical device further comprises a second sub button having a fastening feature adapted to removably attach a second cosmetic cap to the second sub button; and
the second sub button is arranged to function as a pushbutton with or without the second cosmetic cap attached to the second sub button.

37. The electrical device of claim 36 where:
the electrical device comprises a fault circuit interrupter;
the first sub button is arranged as a test button for the fault circuit interrupter; and
the second sub button is arranged as a reset button for the fault circuit interrupter.

38. An interchange kit comprising:
an interchangeable cover having front and back surfaces and a face with fastening features sized and positioned to be removably attached to a face of an electrical device and the cover including an opening extending through the front and back surfaces, the opening configured and sized to allow access to a sub button on an electrical device; and
a cosmetic cap having fastening features adapted to be removably attached to fastening features on the sub button and to pass through the opening of the cover.

39. The interchange kit of claim 38 where the cosmetic cap includes a retainer feature to prevent removal of the cosmetic cap while the cover is attached to the electrical device.

40. The interchange kit of claim 39 where the retainer feature comprises a flange on the cosmetic cap arranged to engage the cover as the cosmetic cap moves through the opening of the cover.

41. The interchange kit of claim 39 where:
the opening is a first opening, the sub button is a first sub button, and the cosmetic cap is a first cosmetic cap;
the cover comprises a second opening arranged to access a second sub button on the electrical device; and
the interchange kit further comprises a second cosmetic cap adapted to be removably attached to the second sub button and to pass through the second opening of the cover.

42. The interchange kit of claim 41 where:
the first cosmetic cap is labeled reset; and
the second cosmetic cap is labeled test.

43. The interchange kit of claim 42 where:
the first and second openings are arranged to align with reset and test buttons, respectively, on a fault circuit interrupter device.

44. A system comprising:
an electrical device having a pushbutton and on a face of the electrical device and the pushbutton; and
an interchangeable cover having front and back surfaces and hinge feet sized and positioned to correspond to the fastening features on the face of the electrical device to be removably attached to the face of the electrical device, the interchangeable cover having openings corresponding to and alignable with receptacle openings on the electrical device, the openings extending through the cover;
where the cover includes an opening for accessing the pushbutton; and
where the pushbutton includes a sub button having fastening features and a cosmetic cap having fastening features corresponding to the fastening features on the pushbutton adapted to be removably attached to the sub button.

45. The system of claim 44 further comprising a guide arranged to guide the pushbutton in the opening of the cover.

46. The system of claim 45 where the guide is integral with the cover.

47. The system of claim 45 where the guide includes:
a first portion that is integral with the cover; and
a second portion that is integral with the electrical device.

48. The system of claim 44 where:
the pushbutton, opening, sub button and cosmetic cap are a first pushbutton, a first opening, a first sub button and a first cosmetic cap, respectively;
the electrical device includes a second pushbutton;
the cover includes a second opening for accessing the second pushbutton; and
the second pushbutton includes a second sub button and a second cosmetic cap adapted to be removably attached to the second sub button.

49. The system of claim 48 where:
the electrical device comprises a fault circuit interrupter;
the first pushbutton is arranged to operate as a reset button for the fault circuit interrupter; and
the second pushbutton is arranged to operate as a test button for the fault circuit interrupter.

50. A method of changing an interchangeable cover on an electrical device comprising:
engaging hinge feet on the interchangeable cover having front and back surfaces with a retention feature on the electrical device, the electrical device having a raised portion;
pivoting the cover to an installed position on the electrical device, wherein openings on the cover extend through the front and back surfaces and correspond to receptacle openings on the electrical device and allow access to the receptacle openings; and fastening the cover in the installed position.

51. The method of claim 50 where fastening the cover comprises inserting a snap into an opening.

52. The method of claim 50 further comprising flexing the cover to force a front of the cover against a face of the electrical device.

53. The method of claim 52 where:
the cover includes two sides arranged on opposite sides of the cover;

the face of the electrical device is arranged on the raised portion of the electrical device; and flexing the cover includes flexing the sides in opposite directions to fit over the raised portion.

54. The method of claim 53 where flexing the sides in opposite directions comprises engaging at least one of the sides of the cover with at least one rib on a side of the raised portion.

55. A method of changing an interchangeable cover for an electrical device comprising:
   attaching a removable cap to a sub button on the face of the electrical device, the removable cap and the sub button having corresponding fastening features, the electrical device having a raised portion; and
   attaching a removable cover to the face of the electrical device by hinge feet on the removable cover and corresponding openings on the face of the electrical device, wherein the cap is guided through an opening in the cover.

56. The method of claim 55 where the cap is guided through the opening by a guide projecting from a back of the cover.

57. The method of claim 55 further comprising preventing the cap from being removed from the sub button while the cover is attached to the electrical device.

58. The method of claim 55 where the sub button is arranged to operate regardless of the presence or absence of the cap and/or cover.

* * * * *